(12) United States Patent
Wright et al.

(10) Patent No.: US 10,681,198 B2
(45) Date of Patent: Jun. 9, 2020

(54) AUDIENCE INTERACTION SYSTEM AND METHOD

(71) Applicant: Nymbus, LLC, Pittsburgh, PA (US)

(72) Inventors: David Wright, Pittsburgh, PA (US); Nicholas Amoscato, Pittsburgh, PA (US); Matthew Beck, Emsworth, PA (US)

(*) Notice: Subject to any disclaimer, the term of this patent is extended or adjusted under 35 U.S.C. 154(b) by 282 days.

(21) Appl. No.: 15/684,500

(22) Filed: Aug. 23, 2017

(65) Prior Publication Data

US 2018/0077276 A1    Mar. 15, 2018

Related U.S. Application Data

(60) Provisional application No. 62/414,046, filed on Oct. 28, 2016, provisional application No. 62/393,568, filed on Sep. 12, 2016.

(51) Int. Cl.
*H04M 1/725* (2006.01)
*G06F 3/01* (2006.01)
*G06F 3/0482* (2013.01)
*G06F 1/16* (2006.01)

(52) U.S. Cl.
CPC ........ *H04M 1/72522* (2013.01); *G06F 3/014* (2013.01); *G06F 1/163* (2013.01); *G06F 3/0482* (2013.01); *H04M 1/72569* (2013.01)

(58) Field of Classification Search
CPC ....... H04W 4/023; H04W 4/021; H04W 4/38; H04W 52/0254; H04W 84/12; H04W 4/02; H04W 4/027; H04W 4/029; H04W 4/14; H04W 4/80; G06F 1/163; G06F 16/638; G06F 1/1694; G06F 1/3231; H04M 2250/12; H04M 1/72569; H04M 1/72552;
(Continued)

(56) References Cited

U.S. PATENT DOCUMENTS 6,433,483 B1  8/2002  Michael et al.
6,717,376 B2  4/2004  Lys et al.
7,856,235 B2  12/2010  Syrjärinne
(Continued)

OTHER PUBLICATIONS

Johannes Schmid, Frederik Beutler, Benjamin Noack, Uwe D. Hanebeck, and Klaus D. Muller-Glaser, "An Experimental Evaluation of Position Estimation Methods for Person Localization in Wireless Sensor Networks", EWSN 2011, LNCS 6567, pp. 147-162, 2011.
(Continued)

*Primary Examiner* — Charles N Appiah
*Assistant Examiner* — Xiang Zhang

(57) ABSTRACT

A retrieving component connects to a server to download a cue stack for the interactive event with the cue stack having a series of cues for a plurality of effects, including at least one of a screen color effect, a screen image effect, and a flashing effect, arranged in a predetermined order. A receiving component receives at least one cue trigger from a localized trigger generator. A rendering component matches the cue trigger to a cue within the cue stack. The rendering component can activate the screen to display a color in response to a cue for a screen color effect, can activate the screen to display an image in response to a cue for a screen image effect, and can activate the flashing device in response to a cue for a flashing effect.

19 Claims, 13 Drawing Sheets

(58) Field of Classification Search
CPC .......... H04M 1/72597; H04M 3/42382; H04L 51/24; H04L 67/16; H04L 51/32
See application file for complete search history.

(56) References Cited

U.S. PATENT DOCUMENTS

| | | | |
|---|---|---|---|
| 8,233,919 B2 | 7/2012 | Haag et al. | |
| 8,238,869 B2 | 8/2012 | Brayton | |
| 8,249,549 B1 | 8/2012 | Rahman et al. | |
| 8,254,877 B2 | 8/2012 | Edge et al. | |
| 8,254,879 B2 | 8/2012 | Wijayanathan et al. | |
| 8,295,866 B2 | 10/2012 | Kwon et al. | |
| 8,502,480 B1 | 8/2013 | Gerszberg et al. | |
| 8,941,332 B2 | 1/2015 | Gerszberg | |
| 9,066,383 B2 | 6/2015 | Gerszberg | |
| 2005/0211068 A1* | 9/2005 | Zar | G10H 1/0008 84/600 |
| 2012/0088544 A1* | 4/2012 | Bentley | A63F 13/06 455/556.1 |
| 2012/0163520 A1* | 6/2012 | Liu | G01S 5/0018 375/356 |
| 2013/0282839 A1* | 10/2013 | Alcala | H04N 21/4788 709/206 |
| 2014/0171039 A1* | 6/2014 | Bjontegard | H04L 29/06034 455/414.1 |
| 2014/0273858 A1 | 9/2014 | Panther et al. | |
| 2015/0289227 A1 | 10/2015 | Becker et al. | |
| 2016/0088440 A1* | 3/2016 | Palanki | H04W 4/04 455/456.1 |
| 2016/0105923 A1* | 4/2016 | Chen | H04W 88/02 455/41.2 |
| 2016/0150039 A1* | 5/2016 | Miettinen | H04L 67/22 709/204 |
| 2016/0173440 A1* | 6/2016 | Stahura | H04L 61/1511 709/245 |
| 2017/0172424 A1* | 6/2017 | Eggers | A61B 5/0205 |
| 2017/0180954 A1 | 6/2017 | McHugh | |

OTHER PUBLICATIONS

Bernhard Buchli, Felix Sutton, and Jan Beutel, "GPS-Equipped Wireless Sensor Network Node for High-Accuracy Positioning Applications", EWSN 2012, LNCS 7158, pp. 179-195, 2012.

Ryo Sugihara and Rajesh K. Gupta, "Clock Synchronization with Deterministic Accuracy Guarantee", EWSN 2011, LNCS 6567, pp. 130-146, 2011.

Karimi, Hassan A. 2011. Universal Navigation on Smartphones. Springer, pp. 59-72.

www.hurdl.com website landing page downloaded on Dec. 8, 2017.

* cited by examiner

AUDIENCE INTERACTION SYSTEM AND METHOD

CROSS REFERENCE TO RELATED APPLICATION

This application claims the benefit under 35 U.S.C. § 119(e) of U.S. Provisional Application No. 62/393,568 entitled "AUDIENCE INTERACTION SYSTEM AND METHOD" filed Sep. 12, 2016, and U.S. Provisional Application No. 62/414,046 entitled "AUDIENCE INTERACTION SYSTEM AND METHOD" filed Oct. 28, 2016, which are incorporated herein by reference.

BACKGROUND

Audience interaction systems are systems that enable participants at live events to become more fully immersed in location-based events, such as theatrical performances, concerts, professional sporting events, and other live events. Existing audience interaction systems, as well as systems that have been proposed, include systems that utilize heads-up displays and unmanned aerial vehicles (i.e., drones). These systems can use drones to beam live video feeds to audience members wearing heads-up displays. Such systems are designed to give audience members a view of the action from an on-stage perspective, to aid hearing-impaired audience members during live performance, or to improve communications within the performance technical running crew.

Other systems utilize environmental sensors that are embedded in spaces and physical objects as part of the "Internet of things". Still other systems utilize holograms. However, holograms must be deployed in a controlled environment and require substantial technical skill on the part of operators.

The ubiquitous nature of smartphones and other mobile computing devices has presented a challenge to traditional live events in recent years. Arts organizations, in particular, have recognized the persistent and disruptive "glowing screen" of smartphones and have tested various strategies to minimize, if not eliminate, disruptions. However, these strategies will not be necessary if such smartphones can be incorporated into audience interaction systems.

Smartphones include many features that could be used in audience interactive systems. Some productions have attempted to engage smartphone-using audience members by providing online content meant to be accessed in tandem with the live experience. Similarly, lively virtual conversations have been created using Twitter hashtags during live concerts.

Smartphones introduce the potential for private interactivity with people not in the venue. However, smartphones can be undesirable at many live events because audiences can use their phones to engage with people and content that is outside of and often unrelated to the shared communal context of the live performance. Importantly, even if an audience member is actually using the phone to tweet or text a friend or acquaintance in the venue about the performance, audience members surrounding them will not know that they are engaged in conversation about the show. Indeed, given the sheer vastness of communications that occur on personal devices, audience neighbors are justified in the assumption that someone engaged in a text conversation through a smart device is not participating in the show.

Moreover, smartphones are not uniform in design and include features that are constantly changing as technology improves. Due to the collective nature of the experience of live performances, the fact that smartphones include constantly changing features and different capabilities provide a challenge for the development of audience interaction systems.

More significantly, Internet connectivity and data transfer in live performance environments is a significant consideration even for Wi-Fi and cellular technologies. Performance venues seldom provide Wi-Fi for audiences and the physical construction of venues frequently blocks out or impedes cellular reception. Internet connectivity can become sluggish in high-density settings, such as crowded theaters. Major Wi-Fi suppliers such as Cisco and Aruba Networks have developed solutions for high-density settings, but these Wi-Fi grids are costly to design and install. Smaller venues can be equipped with Wi-Fi.

Existing audience interaction systems have many limitations due to the inherent challenges of performance experience design that have not yet been solved in an effective or consistent manner. As a result, there is a need for an improved audience interaction system that can allow audiences to participate en masse. Such a system would have an enormous potential to improve experiences, increase financial returns, and yield valuable data on live experiences.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a retrieving component connects to a server to download a cue stack for the interactive event with the cue stack having a series of cues for a plurality of effects, including at least one of a screen color effect, a screen image effect, and a flashing effect, arranged in a predetermined order. A receiving component receives at least one cue trigger from a localized trigger generator. A rendering component matches the cue trigger to a cue within the cue stack. The rendering component can activate the screen to display a color in response to a cue for a screen color effect, can activate the screen to display an image in response to a cue for a screen image effect, and can activate the flashing device in response to a cue for a flashing effect.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

Figure 1:
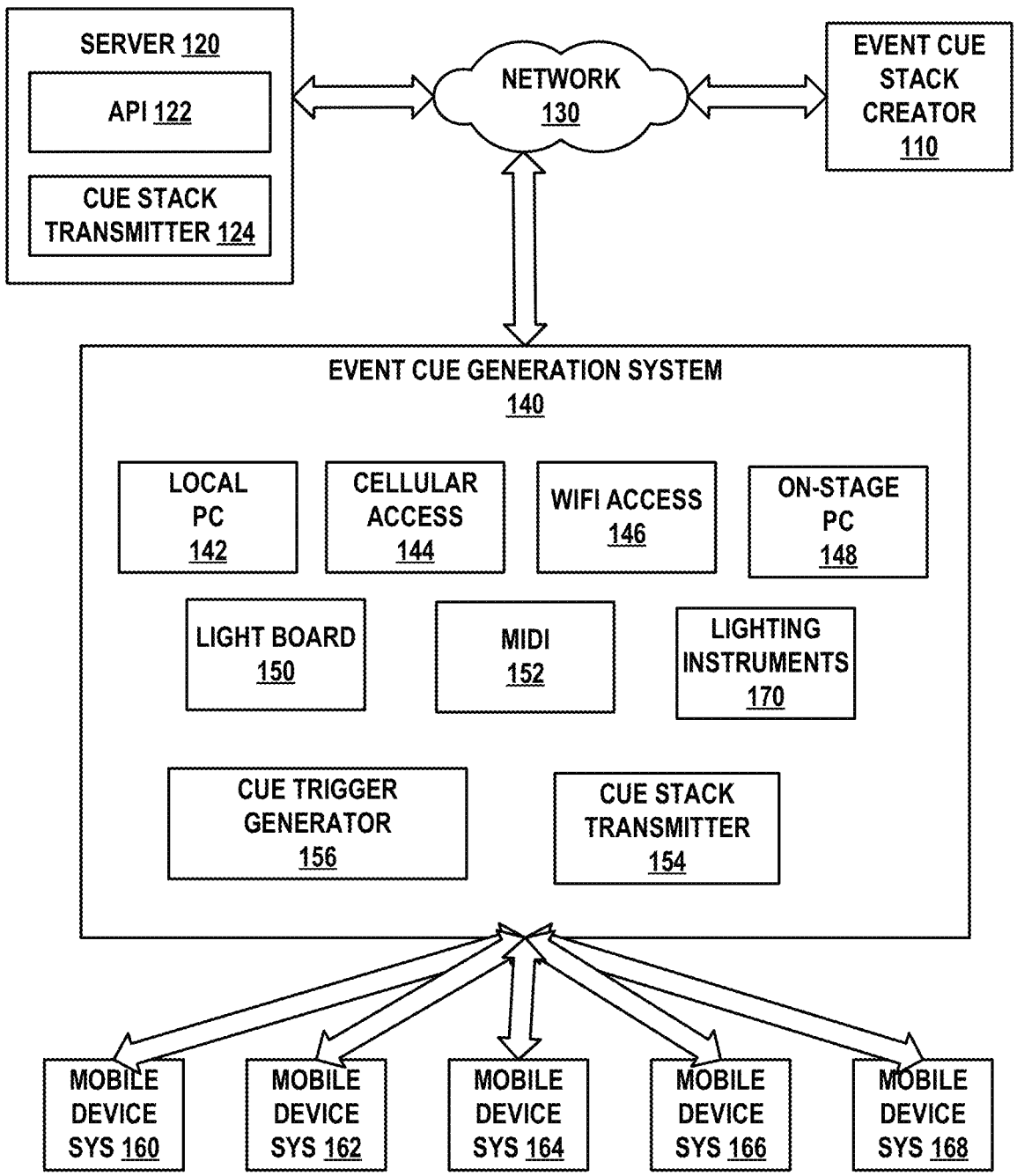
FIG. 1 illustrates an embodiment of an exemplary operating environment that can implement aspects of the described subject matter.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more aspects of the described subject matter. It is to be appreciated, however, that such aspects can be practiced without these specific details. While certain components are shown in block diagram form to describe one or more aspects, it is to be understood that functionality performed by a single component can be performed by multiple components. Similarly, a single component can be configured to perform functionality described as being performed by multiple components.

As used herein, a "cue stack creation component", an "event cue stack creator", or a "cue stack generator" includes a computer system or computing device that allows the user to create a tree-like representation of each event, so that the user can assign cues to each song and/or song segment to form a cue stack for uploading to a server.

As used herein, a "cue stack transmitter" or an "event cue stack transmitter" includes software or hardware devices or components of devices configured to a send a cue stack or a plurality of cue stacks in the form of data or data structures to mobile device systems.

As used herein, a "cue trigger generator" or an "event cue trigger generator" includes a physical device (or a virtual device that controls a physical device) that has the ability to utilize a processor to convert input into a signal that corresponds to a cue that can be sent to a mobile device or a plurality of mobile devices. The cues can be in the form of data or data structures.

As used herein, a "receiving component" includes a software application, program module, or other similar set of computer instructions that interfaces with a network connecting device or network connecting system to connect to a device, such as a server. The receiving component can download cue triggers in the form of data structures to a mobile device.

As used herein, a "rendering component" includes a software application, program module, or other similar set of computer instructions particularly adapted to interface with a processor on a mobile device to process the cue triggers and the cue stack to determine which effects should be rendered on the mobile device.

As used herein, a "retrieving component" includes a software application, program module, or other similar set of computer instructions that interfaces with a network connecting device or network connecting system for a mobile device to facilitate connections to hardware or a virtual device to download data structures to a mobile device, such as the mobile device.

An audience interaction system that uses the connectivity of mobile devices, such as smartphones, to deliver and receive data to and from audience members at a live event has been developed. Current smartphones are capable of an astounding variety of interactions, including the ability to be used as a lighting instrument. Smartphones can be incorporated into an audience interaction system to create the most overt interactions, while minimizing the alteration of performance choices by performers themselves. Smartphones also have the ability to send and to receive text messages that can be displayed on screens, to play audio files through phone speakers, and to provide users with links to web-based content, such as an online surveys, images, or websites. The images can be static images or videos that include captured or simulated motion.

The developed system enables two-way, data-rich interactions such as text messaging, images and sound. However, traditional methods of connecting devices, such as through Internet connectivity, is limited and presents challenges. Specifically, Internet latency can delay communications between a server and mobile clients that can limit the amount of synchronization that can be achieved between mobile devices.

It is known that Internet latency can cause components in existing audience interaction systems to produce effects or effect channels that are varied in timing and that cannot be synchronized. However, latency can be minimized through existing technologies that maintain open connections between the server and client phones, but there will nonetheless be unavoidable delays in the communication between phones and servers.

The instant audience interaction system overcomes these limitations by utilizing a mobile application (app) platform that is run through a smartphone. The platform can exploit and enhance many smartphone features by interfacing with other system components, such as screens that can be utilized for user input, LED flash, camera functionality, global positioning (GPS) for location-based functionality within 20-30 meters, WiFi triangulation and other indoor positioning methods for precise indoor location-based functionality, microphone, Bluetooth, Wi-Fi and cellular connectivity.

Smartphones include many other features, such as internal accelerometers, that can facilitate the interactive experience of audience members and can be used to collect data relating to their behavior. Smartphone accelerometers can sense multiple directions of movement, which can determine not only phone orientation, but also motion, tilt, shock, and vibration. Smartphones can include gyroscopes that can measure the velocity of change within these vectors of movement. Phone proximity sensors can collect data about the current use of the phone relative to the person using it. Ambient light sensors are also common. Additionally, smartphones can be coupled to wearable LED items.

Referring to FIG. 1, an exemplary operating environment, generally designated as 100, that can implement aspects of the described subject matter is illustrated. The operating environment 100 includes an event cue stack creator 110 that connects to a server 120 that can include an API 122 and an event cue stack transmitter or a cue stack transmitter 124. The event cue stack creator 110 and the server 120 connect to one another and to an event cue generation system 140 over the network 130. The event cue generation system 140 is located at the site of an event. The event cue stack generator or event cue stack creator 110 can be an event cue stack creation module or event cue stack creation component.

The event cue generation system 140 can include a local PC 142, a cellular access point 144 and a WI-FI access point 146. The local PC 142 can connect to on-stage PC 148, which can connect to a light board 150 and a MIDI implementing device 152 within the event cue generation system 140. The event cue generation system 140 can also include a cue stack transmitter 154 and a cue trigger generator 156. The server 120 and the event cue generation system 140 can connect to a plurality of mobile device systems 160-168 through the cellular access point 144 and the WI-FI access point 146. It should be understood that the MIDI implementing device 152 can be replaced with a device that utilizes DMX protocol.

Event cue stack creator 110, server 120, local PC 142, on-stage PC 148, and/or mobile device systems 160-168, or portions thereof, can be implemented by various types of operating environments, computer networks, platforms, frameworks, computer architectures, and/or computing devices. For example, event cue stack creator 110, server 120, local PC 142, on-stage PC 148, and/or mobile device systems 160-168 can include components implemented by computer-executable instructions that are stored on one or more computer-readable storage media and that are executed to perform various steps, methods, and/or functionality in accordance with aspects of the described subject matter.

Implementations of event cue stack creator 110, server 120, local PC 142, on-stage PC 148, and/or mobile device systems 160-168 are described in the context of a system configured to perform various steps, methods, and/or functionality in accordance with aspects of the described subject matter. It is to be appreciated that a computer system can be implemented by one or more computing devices. Implementations of event cue stack creator 110, server 120, local PC 142, on-stage PC 148, and/or mobile device systems 160-168 can be described in the context of "computer-executable instructions" that are executed to perform various steps, methods, and/or functionality in accordance with aspects of the described subject matter.

In general, a computer system can include one or more processors and storage devices (e.g., memory and disk drives) as well as various input devices, output devices, communication interfaces, and/or other types of devices. A computer system also can include a combination of hardware and software. It can be appreciated that various types of computer-readable storage media can be part of a computer system. As used herein, the terms "computer-readable storage media" and "computer-readable storage medium" do not mean and unequivocally exclude a propagated signal, a modulated data signal, a carrier wave, or any other type of transitory computer-readable medium. In various implementations, a computer system can include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable files, executable components, program modules, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

Event cue stack creator 110, server 120, local PC 142, on-stage PC 148, and/or mobile device systems 160-168 can implement and utilize one or more program modules. Generally, program modules include routines, programs, objects, components, data structures, etc., that perform particular tasks or implement particular abstract data types.

Event cue stack creator 110, server 120, local PC 142, on-stage PC 148, and/or mobile device systems 160-168 can be implemented as a distributed computing system or environment in which components are located on different computing devices that are connected to each other through network (e.g., wired and/or wireless) and/or other forms of direct and/or indirect connections. In such distributed computing systems or environments, tasks can be performed by one or more remote processing devices, or within a cloud of one or more devices, that are linked through one or more communications networks. In a distributed computing environment, program modules can be located in both local and remote computer storage media including media storage devices. Still further, the aforementioned instructions can be implemented, in part or in whole, as hardware logic circuits, which can include a processor.

Event cue stack creator 110, server 120, local PC 142, on-stage PC 148, and/or mobile device systems 160-168 can be implemented by one or more computing devices such as computers, PCs, server computers configured to provide various types of services and/or data stores in accordance with aspects of the described subject matter. Exemplary sever computers can include, without limitation: web servers, front end servers, application servers, database servers, domain controllers, domain name servers, directory servers, and/or other suitable computers.

The network 130 can be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/or a wireless network.

Audience Interaction System

The exemplary operating environment 100 configures and implements the event cue stack creator 110 to create a cue stack. The event cue stack creator 110 generates a tree-like representation of each event that allows a user to assign cues to each song and/or song segment to form the cue stack. The event cue stack creator 110 uploads the cue stack into the server 120.

The event cue stack creator 110 and/or the server 120 can convert the tree structure of the event into a linear cue stack to make it easier to load the cue stack onto the mobile device systems 160-168. The server 120 can transmit the cue stack to the event cue generation system 140.

The server 120 can configure and implement the API 122 and the cue stack transmitter 124 to transmit the cue stack to each of the mobile device systems 160-168, preferably before the start of the event. Alternatively, the event cue generation system 140 can configure and implement the cue stack transmitter 154 to transmit the cue stack to each of the mobile device systems 160-168. The cue stack transmitters 124 and/or 154 can be software or hardware devices or components of devices configured to send data or data structures with mobile device systems 160-168.

The event cue generation system 140 can configure and implement a device that functions as an event cue trigger generator or a cue trigger generator 156. The cue trigger generator 156 sends cues, in the form of data or data structures in some embodiments, to the mobile device systems 160-168 during the event. The cue trigger generator 156 can be a physical device (or a virtual device that controls a physical device) that has the ability to utilize a processor to convert input into a signal that corresponds to a cue that can be sent to the mobile device systems 160-168.

The mobile device systems 160-168 can respond to the cues by displaying colors, by displaying images, by flashings lights or by implementing other effects. The cues can be triggered at predetermined times and/or time increments. Alternatively, the cues can be triggered by an artist, musician, or other user at a preplanned time, in response to another cue or event, and/or spontaneously.

The exemplary operating environment 100 provides musicians with a creative whitespace to engage with audiences, interactively, and to create a performance with them, using light, sound, color, audience movement, vibration, text, images, video, and audience gestures. The exemplary operating environment 100 enables musicians to light up the screens of the mobile device systems 160-168 to create audience-wide lighting patterns, flash the screen in time with the music, play musical elements through the phone speakers, and drive post-show track downloads, merchandise sales, sponsor impressions, and future interaction.

The exemplary operating environment 100 configures and implements event cue stack creator 110 to enable musicians, producers, artists or others to create event cue stacks. Event cue stacks can include a plurality of event cues. In this exemplary embodiment, a cue stack for a single song can consist of a simple color fade on the screen and a text display of the currently playing song title and by line. Alternatively, a cue stack can be more complex and include parent cue references, time offset, and effect channels. Effect channels can be used to enable the mobile client systems 160-168 to render various effects.

The event cue stack creator 110 can upload a cue stack to the server 120. The cue stack can be a data structure that is formatted by the cue stack creator 110. The server 120 can be implemented within a cloud environment. Cloud environments can be provided by a cloud services provider (i.e., "the cloud"). In such cloud environments, data resources can be abstracted among or across one or more computers and/or computer networks that make up the cloud. Examples of cloud computing environments include S3 by Amazon.com.

The exemplary operating environment 100 configures and implements cue generation system 140 to receive one or more cue stacks from the server 120. The event cue generation system 140 can provide the cue stacks to the mobile device systems 160-168 through the cue stack transmitter 154. However, it should be understood that the mobile device systems 160-168 usually receive the cue stack, directly, from the server 120 via the API 122 and the cue stack transmitter 124.

The cue stack transmitter 154 can send the cue stacks to the mobile device systems 160-168 through the cellular access point 144 and/or the WI-FI access point 146. Alternatively, the mobile device systems 160-168 can access the cue stacks from cue stack transmitter 124 through the network 130 or via a local area network (LAN) that is not connected to the Internet (not shown). Preferably, the mobile device systems 160-168 will download the cue stacks before the beginning of the event.

Once the mobile device systems 160-168 have downloaded the cue stacks, the event cue generation system 140 can configure and implement local PC 142 to initiate the live-cueing of effects and other interactions with the mobile device systems 160-168. The local PC 142 can configure and implement software to implement the cueing or the event cue generation system 140 can configure and implement the on-stage PC 148 to receive cues from musicians, artists or other on-stage users.

The on-stage PC 148 can connect to the light board 150 and the MIDI implementing device 152 to receive cues from musicians. Musicians can plug MIDI compatible instruments into the MIDI implementing device 152 to send the cues to the on-stage PC 148, which assigns cues that are associated with instrument MIDI output for eventual transmission to the mobile device systems 160-168.

The on-stage PC 148 can send cues, directly, to the server 120 or send to the light board 150 via the MIDI implementing device 152. Cues that are programmed based upon input to the light board 150 are sent to the local PC 142 for transfer to the server 120 via the network 130. The local PC 142 or the server 120 can use the information to create cues for transmission to the mobile device systems 160-168.

The server 120 can receive cue triggers and send the cue triggers to the mobile device systems 160-168 through the cue trigger generator 156 through the cellular access point 144 and/or through the WI-FI access point 146. Alternatively, the cue trigger generator 156 can send the cue triggers through a mesh network, through a short-wavelength UHF radio broadcast device that broadcasts radio waves in the ISM band from 2.4 to 2.485 GHz (i.e., a Bluetooth broadcast), through an ultrasonic protocol, or through infrared lighting instruments 170 placed in the venue and controlled via DMX protocol from the light board 150.

The cue trigger generator 156 can send the cue triggers to a single one of the mobile device systems 160-168, to a subgroup of the mobile device systems 160-168, and/or to all of the mobile device systems 160-168. The mobile device systems 160-168 can be synchronized with one another to coordinate the effects that can be triggered with the cue trigger generator 156.

The event cue generation system 140 provides flexibility in terms of cue execution by allowing cue triggers to be initiated from the event stage and by allowing the cue triggers to be initiated through the MIDI implementing device 152. MIDI is the acronym of Musical Instrument Digital Interface, which is a technical standard developed 1983 and is maintained by the MIDI Manufactures Association. The protocol contains 16 channels with each channel transporting messages composed of 128 pieces of information.

Since MIDI signals are generated by musical instruments, much of the data of performance is comprised in the way that the signal is created and sequenced; the channels and message values allows for the MIDI signal to further convey facets of musical performance such as "velocity" of instrument actuation and pitch. The MIDI implementing device 152 can capture information about the dynamics with which a keyboardist strikes the keys. As such, the MIDI implementing device 152 can provide a greater degree of musical data that is useful.

The integration with a MIDI implementing device 152 provides a greater degree of specific interactions based on musical output. For, example, an on-stage keyboard could be used to turn screens on the mobile device systems 160-168 into a certain color depending on what chord the keyboardist plays. Alternately, a chord could be set up on the keyboard and then pushed to playback through the mobile device systems 160-168.

Alternately, the mobile device systems 160-168 could be given directed control of an on-stage keyboard through the use of an app that allows for votes on chord progression. The event cue generation system 140 could limit the available chord progressions to a limited subset of available chords and dynamics. On-stage musicians could then improvise off of this chord progression.

The MIDI implementing device 152 can provide effects and interactions that can be synced with other visual effects programmed on the light board 150. Additionally, interactive feedback from the audience can be monitored and incorporated into the performance by a lighting board operator or other technical staff. Additionally, the event cue generation system 140 can provide the ability to receive messages from the mobile device systems 160-168 and to post the messages or to display images on projection screens (not shown) in the venue.

The server 120 the event cue generation system 140, and the mobile device systems 160-168 utilize logic to minimize latency. The mobile device systems 160-168 engage in a "handshake" process when connecting to server 120 to receive logic in which the server 120 and the mobile device systems 160-168 transmit and receive their internal clock time to each other multiple times in rapid succession to allow synchronization of the cue generation system 140 and the mobile device systems 160-168. Each of the mobile device systems 160-168 is responsible for calculating its relative latency and adjusts the execution of cues accordingly. The server 120 can collect these metrics for reporting purposes.

Figure 2A:
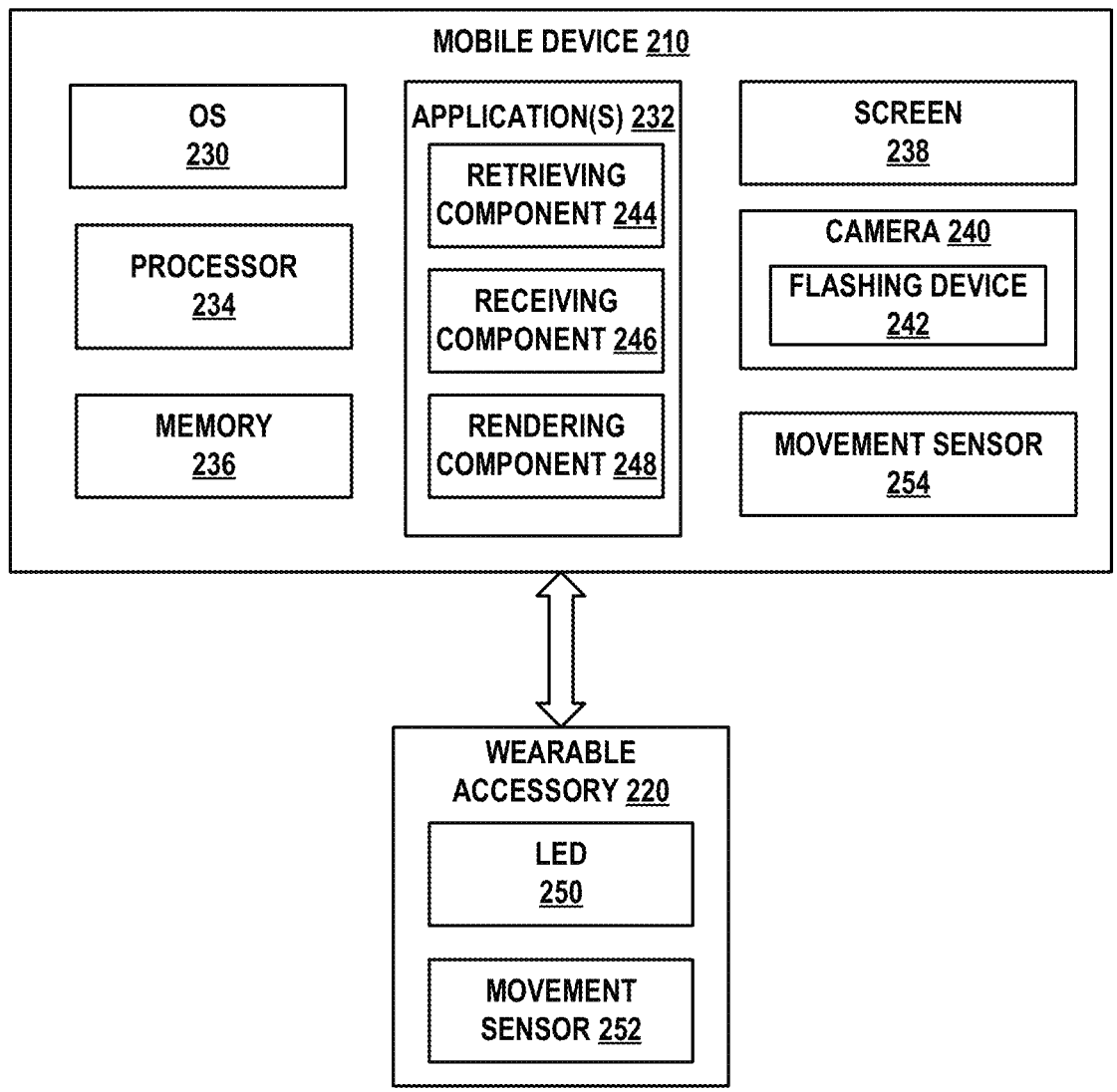
FIG. 2A illustrates an embodiment of an exemplary mobile device system that can implement aspects of the described subject matter.

Referring now to FIG. 2A with continuing reference to the foregoing figure, mobile device system 200 is illustrated as an embodiment of an exemplary mobile device system that can implement aspects of mobile device systems 160-168 shown in FIG. 1. Mobile device system 200 can include mobile device 210 and wearable accessory 220. The wearable accessory 220 can be coupled to the mobile device 210 using a wired connection or a wireless connection, such as a Bluetooth connection or an ultrasonic connection.

Mobile device 210 can include operating system 230 and various types of mobile application(s) 232. In some implementations, mobile application(s) 232 can include one or more client application(s) and/or components of a client application.

Mobile device 210 can include processor 234 for performing tasks such as signal coding, data processing, input/output processing, power control, and/or other functions, and memory 236 that can be used for storing data and/or code for running operating system 230 and/or mobile application(s) 232. Example data can include web pages, text, images, sound files, video data, or other data to be sent to and/or received from one or more network servers or other devices via one or more wired and/or wireless networks.

Mobile device 210 can include screen 238 and camera 240. The camera 240 can include a flashing device 242. Operating system 230, application(s) 232, processor 234, and/or memory 236 can cooperate to utilize screen 238, camera 240, and flashing device 242 to produce effects. The effects can include Color, ColorFlash, CrossFade, Gradient, IntensityShake, Led, Strobe, TickerTape, Colorshake, Endshow, and MP3Playback.

The application(s) 232 can include a retrieving component 244, a receiving component 246, and a rendering component 248. The retrieving component 244 is a software application, program module, or other similar set of computer instructions that interfaces with a network connecting device or network connecting system for a mobile device to facilitate connections to hardware or a virtual device to download data structures to a mobile device, such as the mobile device 210. The retrieving component 244 is particularly adapted to download or retrieve a cue stack in the form of a data structure from the server 120 shown in FIG. 1. The network connecting device can be a cellular phone receiver or a Wi-Fi receiver.

The receiving component 246 is a software application, program module, or other similar set of computer instructions that interfaces with a network connecting device or network connecting system to connect to a device, such as server 120 shown in FIG. 1, to download cue triggers in the form of data structures to a mobile device, such as the mobile device 210. The receiving component 246 can receive the cue triggers from the cue trigger generator 156 shown in FIG. 1. The network connecting device can be a cellular phone receiver or a Wi-Fi receiver.

The rendering component 248 is a software application, program module, or other similar set of computer instructions particularly adapted to interface with a processor on a mobile device to process the cue triggers and the cue stack to determine which effects should be rendered on the mobile device 210. Once the rendering component 248 determines which effect should be rendered, the rendering component 248 can interface with the input/output system of a mobile device, such as mobile device 210, to match the cue triggers with cues in the cue stack to produce the appropriate effects for a particular cue or sequence of cues.

The retrieving component 244 has the ability to perform various steps, including the step of connecting to the server 120 to download a cue stack for an interactive event into the memory 236 for the mobile device 210. The cue stack will include a series of cues, including cues to produce screen color effects, screen image effects, and flashing effects. The cues will be arranged in a predetermined order, so the retrieving component 248 can download the cues in that order or, alternatively, can reconstruct the cues in the desired order.

The receiving component 246 has the ability to receive a cue from the cue trigger generator 156 shown in FIG. 1. The receiving component 246 can utilize the processor 234 and the memory 236 to activate the rendering component 248.

The rendering component 248 can be a conventional mobile device software application, program module, or other similar set of mobile device instructions that activates the screen 238 to display a color in response to a cue for a screen color effect. The rendering component 248 can activate the screen 238 to display an image and/or text in response to a cue for a screen image effect. The rendering component 248 can activate the flashing device 242 in response to a cue for a flashing effect.

The camera 240 can be used to take pictures as part of an effect. One type of effect could involve utilizing the camera 240 as part of a "synchronous camera" function in which the camera 240 snaps a picture in response to a cue from the cue trigger generator 156 shown in FIG. 1. It should be understood that a computing device or computer system, such as event cue stack creator 110, server 120, local PC 142, on-stage PC 148 and/or mobile device systems 160-168 shown in FIG. 1, can be configured to stitch together photos from multiple cameras on multiple devices that are taken simultaneously.

The wearable accessory 220 can include a light emitting diode (LED) 250 and a movement sensor 252. The rendering component 248 can activate the LED 250 to light up in response to a cue trigger corresponding to a cue from the cue stack. The rendering component 248 can implement and utilize the movement sensor 252 as part of an effect or interaction. The movement sensor 252 can be a shock sensor, an accelerometer, gyroscope, combined inertial measurement unit (IMU), or similar device.

The wearable accessory 220 is controlled by the mobile device 210. In this exemplary embodiment, the wearable accessory 220 can activate the LED 250 after it has been turned on and/or connects to the mobile device 210 through a Bluetooth connection.

It should be understood that the wearable accessory 220 and/or the LED 250 can be cued via infrared lighting instruments, such as the lighting instruments 170 shown in FIG. 1, in the venue. In such an embodiment, a user receives the wearable accessory 220, downloads a software program or app to activate the wearable accessory 220.

An artist or performer can cue the wearable accessory 220 via WIFI connectivity and/or cellular connectivity to the mobile device 210 and/or the wearable accessory 220. Alternatively, the artist or performer can broadcast an ultrasonic signal in the venue that is received by the mobile device 210 or wearable accessory 220. In another alternative embodiment, the artist or performer can shine infrared light or signal at an audience, and the wearable accessory 220 can respond to the infrared light or signal.

The wearable accessory 220 can be any suitable wearable accessory that is made from any suitable materials. Exemplary wearable accessories include footwear (e.g., sneakers, rollerblades, ice skates, flip-flops, sandals, etc.); headwear (e.g., caps, hats, headbands, do rags, etc.); apparel (e.g., shirts, pants, jackets, shorts, bodysuits, etc.); jewelry (e.g., bracelets, watches, wristlets, earrings, necklaces, broaches, pins, buttons, button pins, etc.); other wearable items (e.g., wristbands, armbands, handkerchiefs, do-rags, etc.); accessories (e.g., eye glasses, sun glasses, bags, handbags, luggage, backpacks, briefcases, belts, suspenders/braces, glow sticks, holiday lights, lanyards, towels, bandanas, etc.). Preferably, the wearable accessory is a bracelet or a wristband.

The mobile device 210 can configure and implement a movement sensor 254. The movement sensor 254 can trigger cues to implement interactive effects that give the audience the ability to manipulate effects on the mobile device 210 through simple gestures. Exemplary interactive effects can include "IntensityShake", "ColorShake", "Twists", "Hard Stops", "Screen Tapping" and "Elevation" effects. The movement sensor 254 can be a shock sensor, an accelerometer, gyroscope, combined inertial measurement unit (IMU), or similar device.

The IntensityShake effect increases the intensity of screen brightness on screen 238 in response to phone movement. The ColorShake effect changes screen color for screen 238 in response to movement. "Twists" effects create a sequence of effect states as a phone is twisted back and forth around a vertical or horizontal axis.

The "Hard Stops" effect can cycle through effect states as the phone registers rhythmic, pendulum motions punctuated by pauses at each side of the pendulum period. For example, swinging the mobile device 210 to the right could turn the screen blue; swinging it to the left could turn it green.

The "Screen Tapping" effect allows the user to cycle through effect states by tapping the screen. For example, tapping the screen might cycle through a variety of colors on the screen or activate the LED flash (theoretically in time with the music, but the period would be determined by the user).

The movement sensor 252 and the movement sensor 254 can send data to a computing device or computer system, such as event cue stack creator 110, server 120, local PC 142, on-stage PC 148 and/or mobile device systems 160-168 shown in FIG. 1, so that the computing device or computer system can compile data analytics.

Figure 2B:
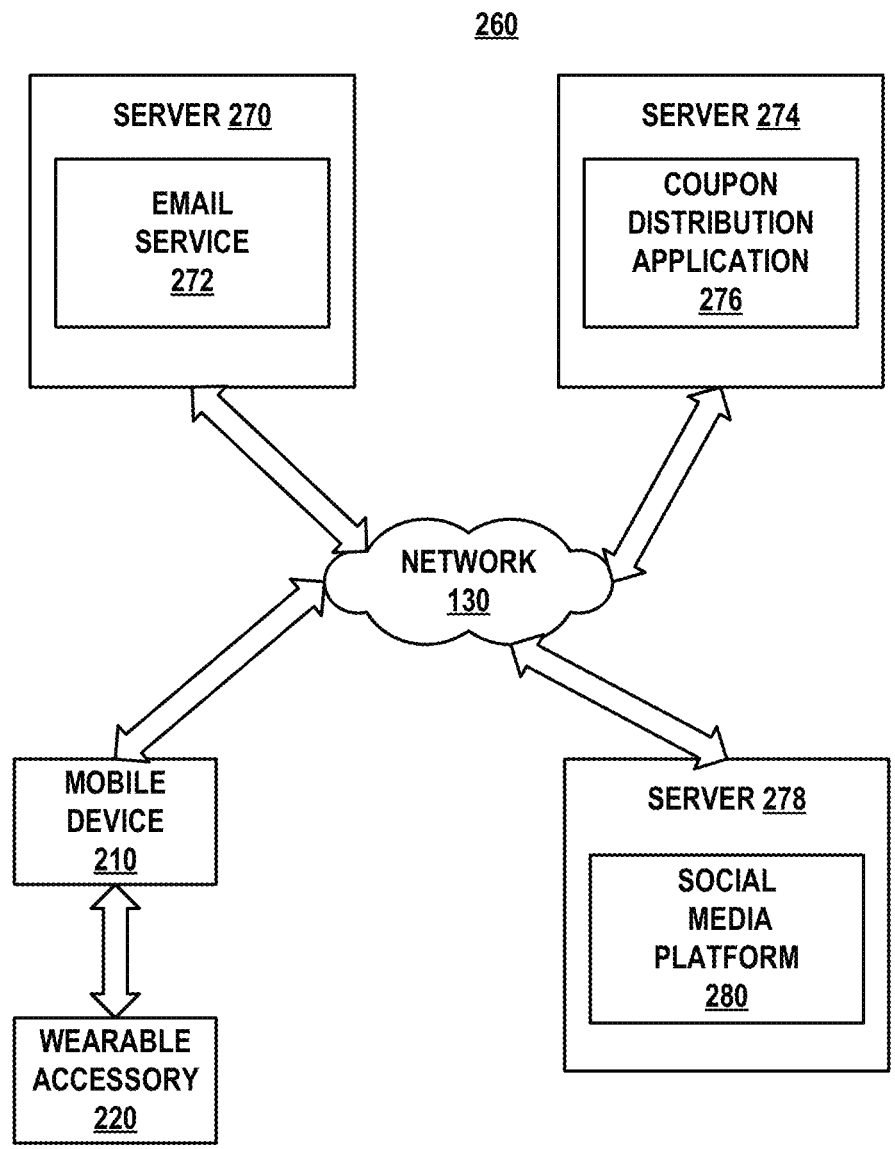
FIG. 2B illustrates another embodiment of an exemplary mobile device system that can implement aspects of the described subject matter.

Referring now to FIG. 2B with continuing reference to the foregoing figures, wearable accessory 220 can be enabled to utilize the movement sensor 252 shown in FIG. 2A to respond to shocks or other impulses, such as human clapping, first pumps, high-fives and/or hand waving, to send impulses to mobile device 210 to prompt a connection to a network 260 and to a server 270. Server 270 can host email service 272 or another equivalent application to add the owner of the mobile device 210 to an email list. Alternatively, wearable accessory 220 can connect to another computing device or computer system, such as event cue stack creator 110, server 120, local PC 142, on-stage PC 148 and/or mobile device systems 160-168 shown in FIG. 1, to prompt the computing device or computer system to add the owner of the mobile device 210 to an electronically stored mailing list, such as an email list.

Similarly, wearable accessory 220 can prompt mobile device 210 to connect to server 274 to utilize a coupon distribution application 276 to request and to receive electronic coupons or other prizes for the owner of the mobile device 210. The coupons or prizes can be sent electronically or through traditional means, such as first class mail or through shipping.

As shown in FIG. 2B, wearable accessory 220 can prompt mobile device 210 to connect to server 278 over the network 260. The server 278 can host a social media platform 280, so that mobile device 210 can post a new status on social media, a "like" on social media, a picture on social media, or a "share" on social media in response to a prompt from the movement sensor 252.

Social media platform 280 can be an Internet platform that allows users to post content and interact with one another. Users of social media platforms, such as social media platform 280, often have the ability to engage in conversations with other users privately or publicly; post pictures, videos, audio, and other media; modify content; and utilize other functionality built into the platform. Some examples of social media platforms include Facebook by Facebook, Inc., Twitter by Twitter, Inc., Vine by Vine Labs, Inc., Instagram by Instagram, Inc., Snapchat by Snapchat, Inc., and others.

Exemplary Show Creation Editor Interface

FIGS. 3A-3D illustrate user interface 300 that is an embodiment of an exemplary show creation editor interface that can implement aspects of the described subject matter. The user interface 300 can be used to create a set of cues, within which are a set of states for various effect types. The effects can include screen color, image overlay, sound playback, LED Flash, phone vibrate, and other effects. It is to be appreciated that aspects of the described subject matter can be implemented by various types of user interfaces that can be presented by event cue stack creator 110, server 120, local PC 142, on-stage PC 148 and/or mobile device systems 160-168 shown in FIG. 1.

Figure 3A:
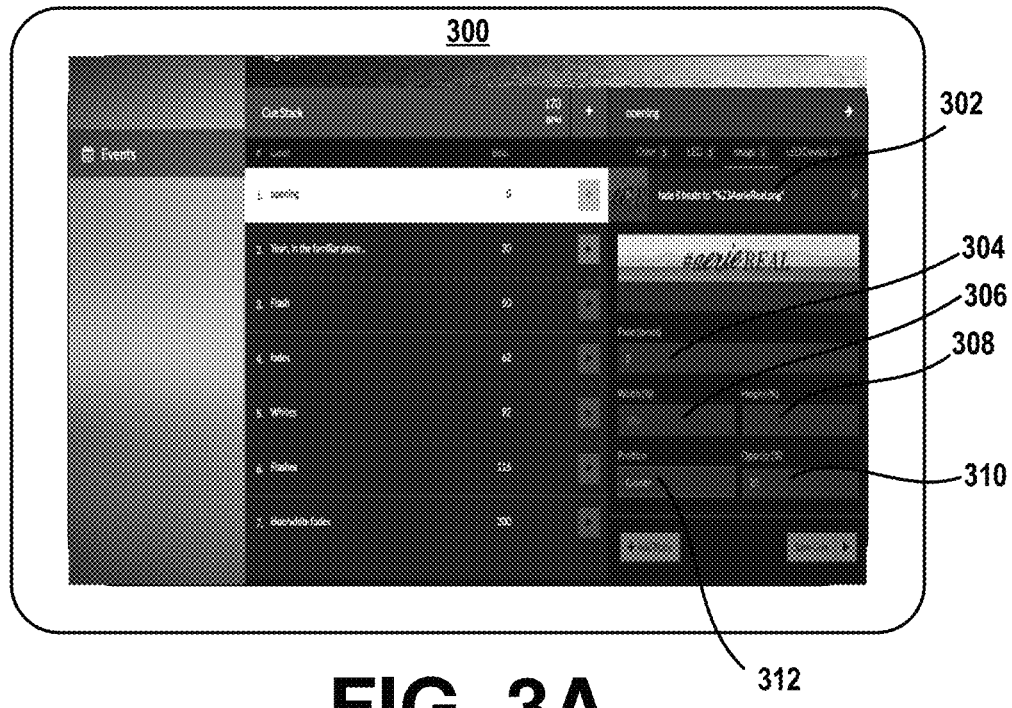
FIG. 3A illustrates an exemplary cue stack creation module interface that can implement aspects of the described subject matter.

Referring to FIG. 3A, the user interface 300 can provide access to an image channel menu 302 that can be used to create an image effect. The image channel menu 302 can include a plurality of input boxes 304-312 that can be used to configure parameters for each image effect in a cue stack.

Input box 304 can be used to set a fade parameter. Input boxes 306-308 can be used to set the height and weight parameters. Input box 310 can be used to set the opacity of the image. Input box 312 can be used to set the position of the image.

Figure 3B:
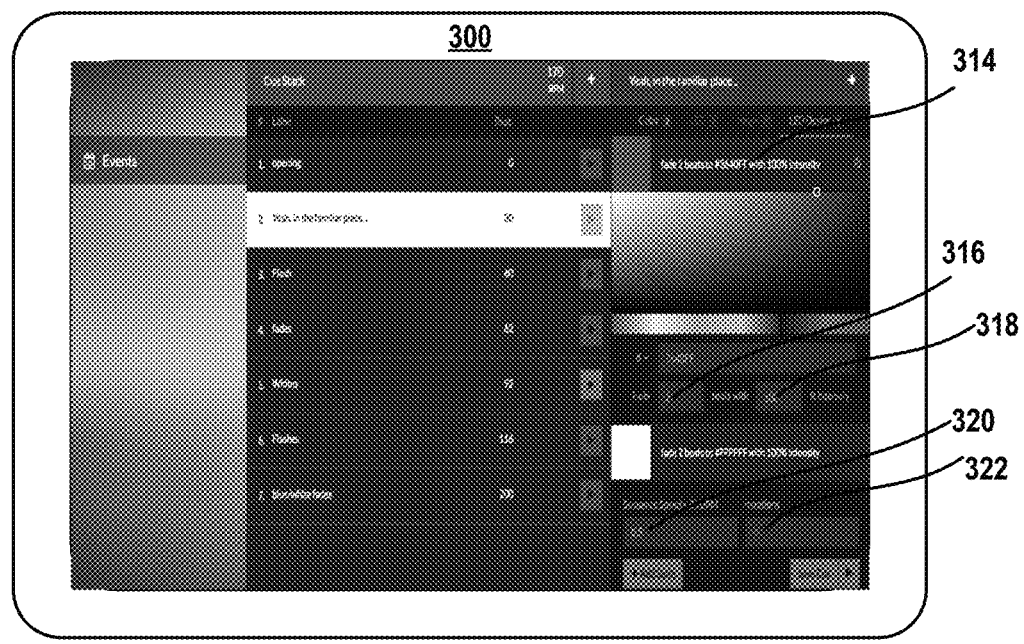
FIG. 3B illustrates another screen of the exemplary user interface shown in FIG. 3A that can implement aspects of the described subject matter.

Referring to FIG. 3B, the user interface 300 can provide access to an LED device channel menu 314 that can be used to create an LED device effect. The LED device channel menu 314 can include a plurality of input boxes 316-322 that can be used to configure parameters for each LED device channel effect in a cue stack.

Input box 316 can be used to set a fade parameter. Input box 318 can be used to set the intensity parameter. Input box 320 can be used to set the sequence speed. Input box 322 can be used to set iterations.

Figure 3C:
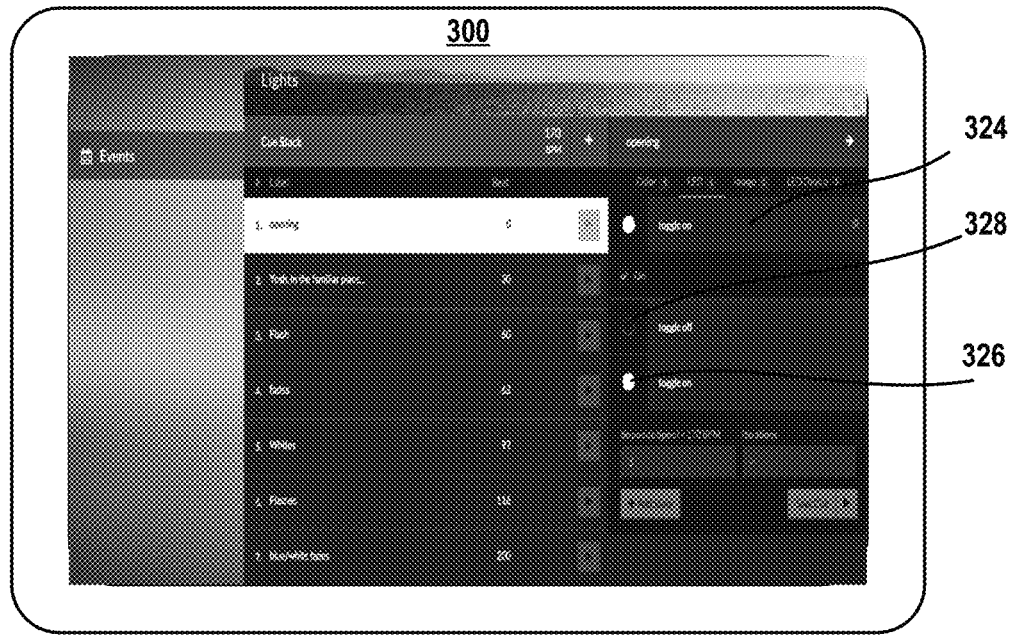
FIG. 3C illustrates another screen of the exemplary user interface shown in FIG. 3A that can implement aspects of the described subject matter.

Referring to FIG. 3C, the user interface 300 can provide access to an LED flash channel menu 324 that can be used to create an LED flash effect. The LED flash effect can be set by clicking on a "toggle on" button 326. The LED flash effect can be unset by clicking on a "toggle off" button 328.

Figure 3D:
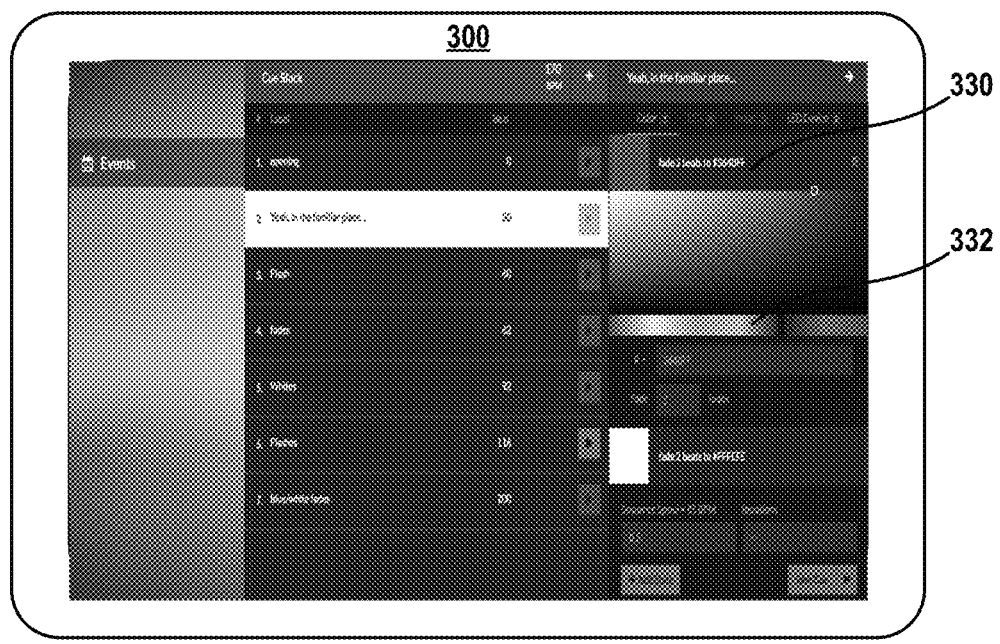
FIG. 3D illustrates another screen of the exemplary user interface shown in FIG. 3A that can implement aspects of the described subject matter.

Referring to FIG. 3D, the user interface 300 can provide access to a screen color channel menu 330 that can be used to set a screen color. The screen color effect can be set by clicking on a section of a spectrum bar 332.

Exemplary Data Model

Figure 4:
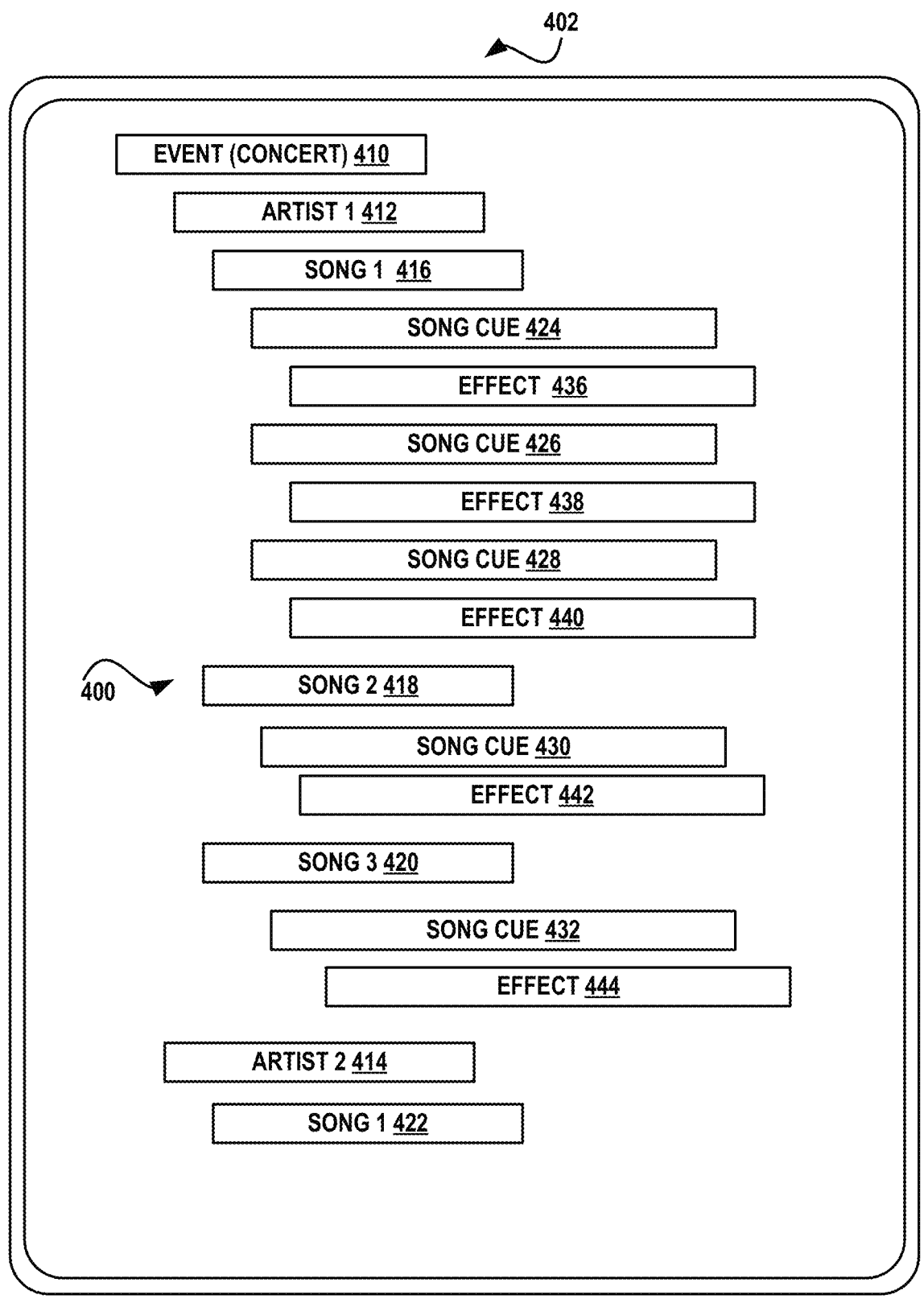
FIG. 4 illustrates a data model for an exemplary map of an event that can implement aspects of the described subject matter.

Referring to FIG. 4 with continuing reference to the foregoing figures, an exemplary data model, generally designated as 400. The data model 400 has an essentially tree-like structure with individual nodes that can be displayed on a display device 402 that is configured and implemented by event cue stack creator 110 shown in FIG. 1. The event cue stack creator 110 can use the data model 400 to assign cues to songs, song sections, or other elements of the event. The elements can be grouped within individual nodes.

The event cue stack creator 110 receives input from artists, musicians, or other users that correspond to cues that can be associated with the data model 400. The structure of the data model 400 can be created by an artist, a musician, a producer, or other user.

The event cue stack creator 110 and/or the server 120 shown in FIG. 1 can convert the data model 400 and the associated cues into a cue stack. Essentially, the event cue stack creator 110 and/or the server 120 can take a tree like structure that corresponds to the event map and convert it into a linear or flat cue stack. Preferably, the data model 400 is converted into a cue stack through the API 122 shown in FIG. 1.

The event cue stack creator 110 can create a single cue stack or a plurality of cue stacks. The cue stacks can be nested, so that segments of an individual cue stack can be used as individual elements within the cue stack or in other cue stacks that can be created later. The flat cue stacks can be sent to mobile device systems 160-168 from the server 120 through cue stack transmitter 124.

As shown in FIG. 4, data model 400 represents a data structure listing the effect states (aka effect configurations) that will be used in a performance for the event title 410. Essentially, the data model 400 is a "map" illustrating when performance effects are to be rendered at a particular time relative to a cue.

The data model 400 has a tree-structure with a pair of artists 412-414 listed at a first logic level. The artists 412-414 are associated with a particular event that has a specified set list time. The next level includes a plurality of songs 416-422 with songs 416-420 being associated with artist 412 and song 422 being associated with artist 414.

The songs 416-420 correspond to segment entities of the event. The songs 416-420 can have meta-information field (not shown) that can be inherited from the corresponding song library for the artists 412-414. Alternatively, meta-information fields can be overridden on a per-event basis. It should be understood that a segment entity does not have to be song.

Each song 416-422 can have a plurality of cues 424-434. Each cue 424-434 can have a corresponding effect 436-442. The effects 436-442 can have parameters (e.g., start and end colors of cross-fade, LED flash beats-per-minute, etc.). In this exemplary embodiment, effect 436 can include instructions to flash the screen for mobile device systems 160-168 shown in FIG. 1 at 60 beats-per-minute (bpm). Effect 438 can include instructions to fade from blue to green on the screens for mobile device systems 160-168, which can be set for a predetermined time period. The visual effects (i.e., the flashes, screen colors, and/or screen images) can be configured to be shown in patterns.

Exemplary Event Creation Interface

FIGS. 5A-5E illustrates an exemplary user interfaces, including artist signup interface 502, venue signup interface 504, and event creation interface 506, that can implement aspects of the described subject matter. It is to be appreciated that aspects of the described subject matter can be implemented by various types of user interfaces that can be configured and implemented by event cue stack creator 110, server 120, local PC 142, on-stage PC 148 and/or mobile device systems 160-168 shown in FIG. 1, and/or other similar computing devices.

Figure 5A:
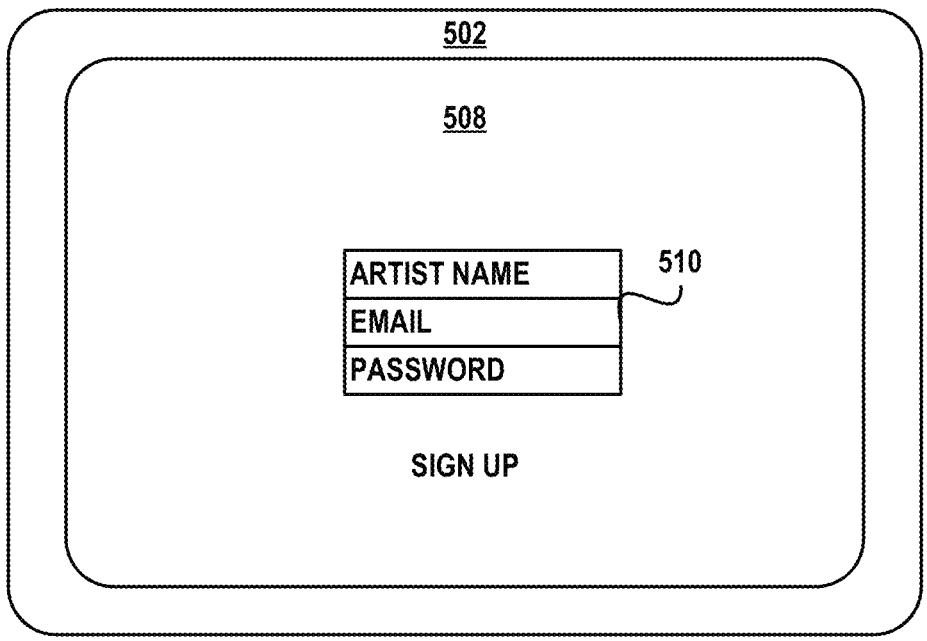
FIG. 5A illustrates an exemplary artist signup interface that can implement aspects of the described subject matter.

Referring to FIG. 5A with continuing reference to the foregoing figures, an exemplary embodiment of artist signup interface 502 is shown. The artist signup interface 502 is displaying an exemplary login page 508 that includes login prompt 510. The login prompt 510 prompts artists to provide minimal identifying information. The login prompt 510 allows users to self-identify as an artist or venue representative, as well.

Figure 5B:
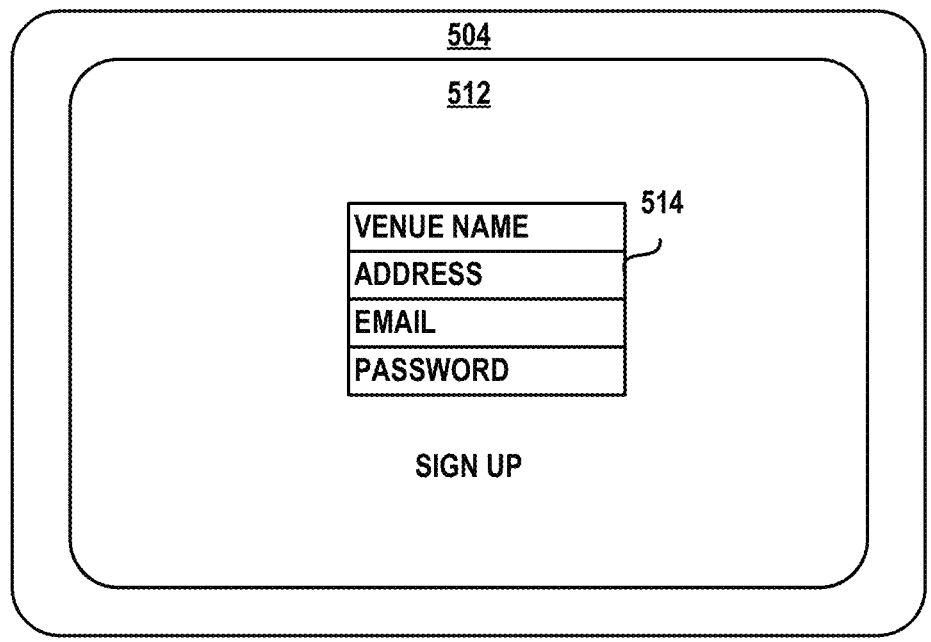
FIG. 5B illustrates an exemplary venue signup interface that can implement aspects of the described subject matter.

Referring to FIG. 5B with continuing reference to the foregoing figures, another representation of user interface for a venue signup interface 504 is shown. In this exemplary representation, a venue signup page 512 is shown. The venue signup page 512 includes prompt 514 that can be used to create an event, such as the event corresponding to data model 400 shown in FIG. 4. Alternatively, the venue signup page 512 can be used to create a series of events or to edit profile information. The information can be used to auto-populate event details.

Figure 5C:
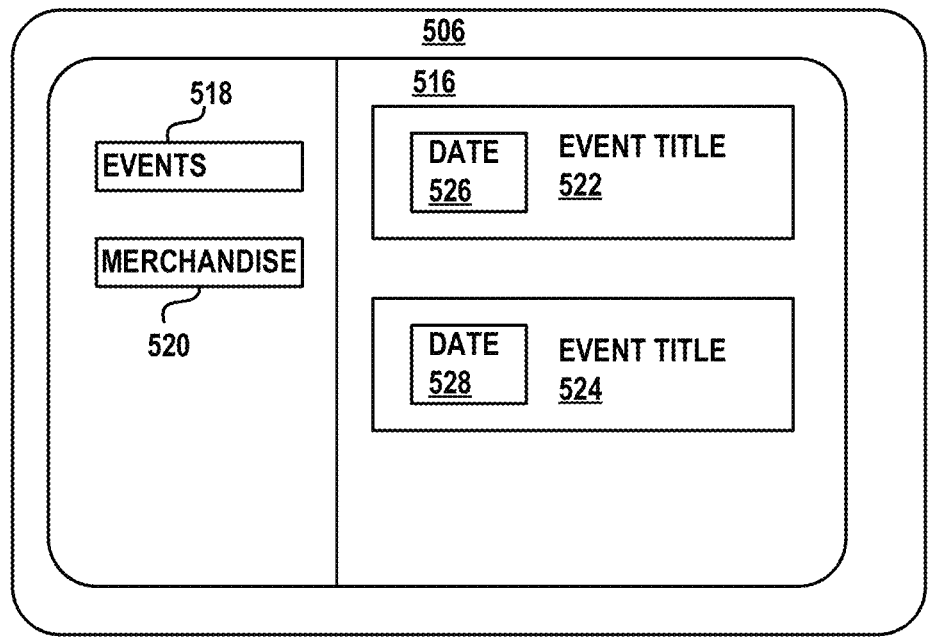
FIG. 5C illustrates an exemplary event creation interface that can implement aspects of the described subject matter.

Referring to FIG. 5C with continuing reference to the foregoing figures, the event creation interface 506 is shown. In this exemplary representation, an event listing page 516 is shown. The event listing page 516 includes an event listing button 518 and a merchandise purchasing button 520. The merchandise purchasing button 520 can include a link to link to a page where event organizers can list merchandise promotions for display in a mobile app (not shown). The page can be used to target audience members with specific promotions based upon the audience members' actions or profile. The page can allow audience members to purchase items that can be picked up at a "merch" table at the venue or that can be shipped to the homes of audience members.

Event listing button 518 can be used to generate a list of events 522-524 in which the operating environment 100 shown in FIG. 1 is going to be used. Each event can have a corresponding date 526-528. The events 522-524 can include local events, regional events, national events, or worldwide events.

Figure 5D:
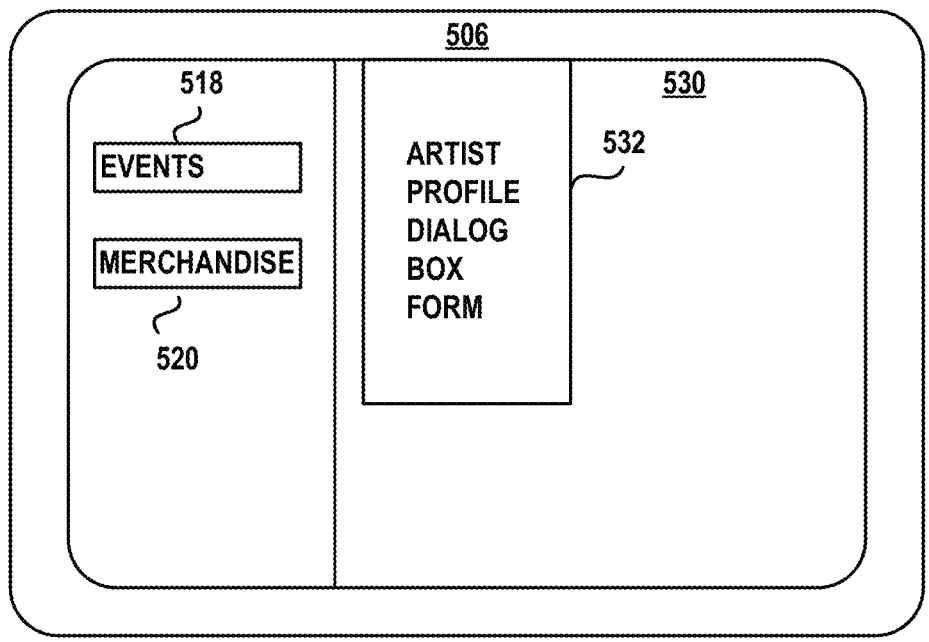
FIG. 5D illustrates another screen of the exemplary event creation interface shown in FIG. 5C that can implement aspects of the described subject matter.
Figure 5E:
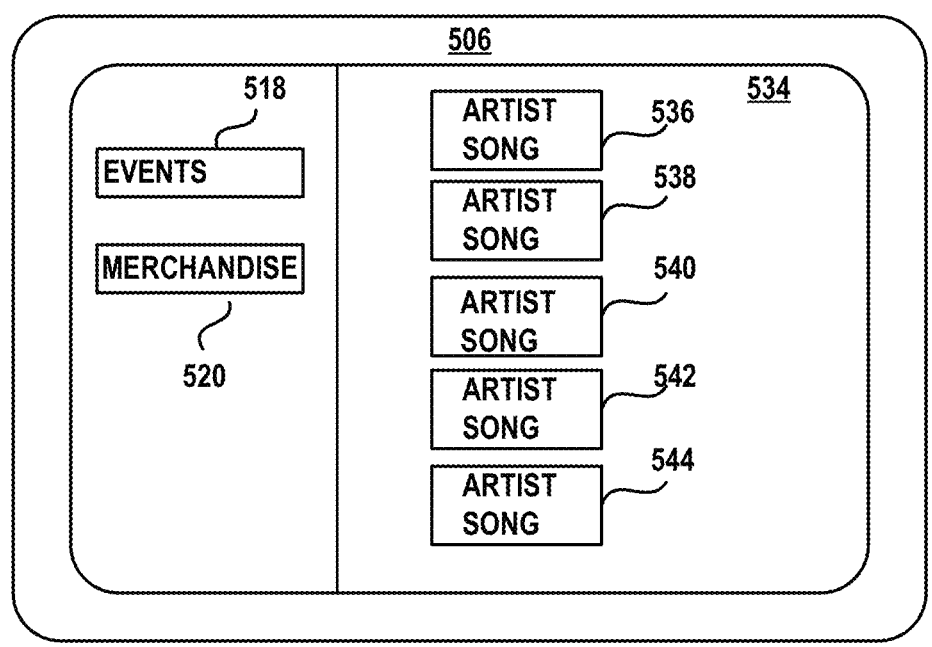
FIG. 5E illustrates another screen of the exemplary event creation interface shown in FIG. 5C that can implement aspects of the described subject matter.

Referring to FIGS. 5D-5E with continuing reference to the foregoing figures, two additional representations of event creation interface 506 are shown. Another representation of an event listing page 530 includes an event creation drop down dialog box form 532 in which the user can link an event to a venue, list the artist(s) playing in their order of importance, designate start times for each artist (known as the "slot list"), upload an event marketing image, and select from a pre-defined list of color pallet options that will be used to stylize the mobile app for that particular event.

Once an event is created, artists can open it and design their song set list for that event. An event screen 534 can show a set list that includes a list of songs 536-544. Each song title and meta-data, such as song writer, is provided in the set list. Once the songs 536-544 are added to the set list, additional interactive features can be "attached" to it to be played back during the live performance.

Once a set list of songs 536-544 for an event is set up, it can be released to the mobile app. This release means that the event will appear in the app, so that audiences can see a list of events near them. However, effects, song titles and bylines will not be visible until cued during an event. The mobile app can be loaded onto the mobile device systems 160-168 shown in FIG. 1.

It should be understood that artist signup interface 502, venue signup interface 504, and event creation interface 506 can implement other interactions that can be created and added to data associated with each song. These interactions can include questions or audience polls, direct text and photo messages to the audience, and coupons for the purchase of merchandise and/or food and beverage either through the mobile app or at a merchandise table or bar in the venue.

Exemplary Mobile Device Systems Interfaces

Figure 6A:
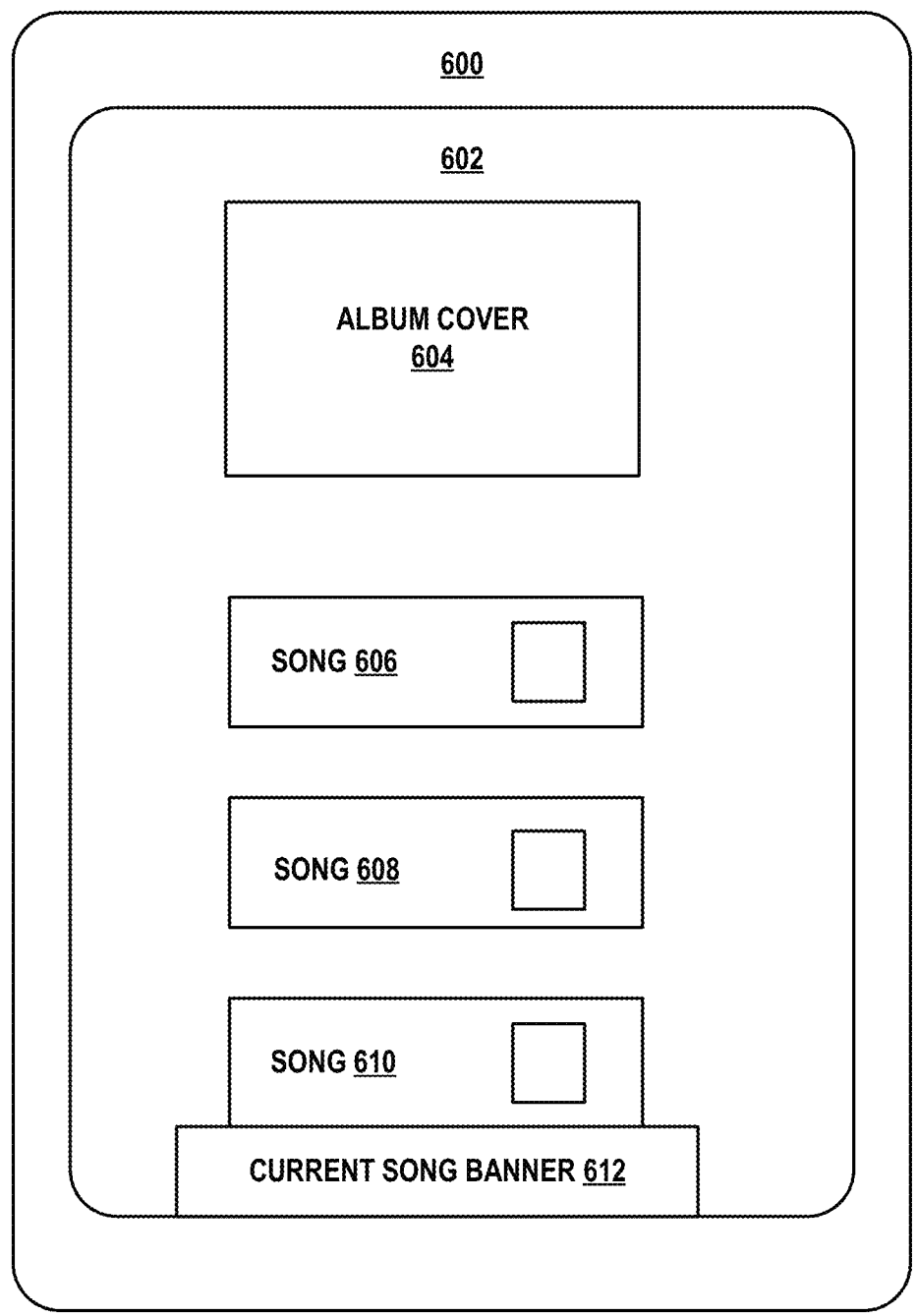
FIG. 6A illustrates an exemplary user interface for a mobile device that is being used during an event and that can implement aspects of the described subject matter.
Figure 6B:
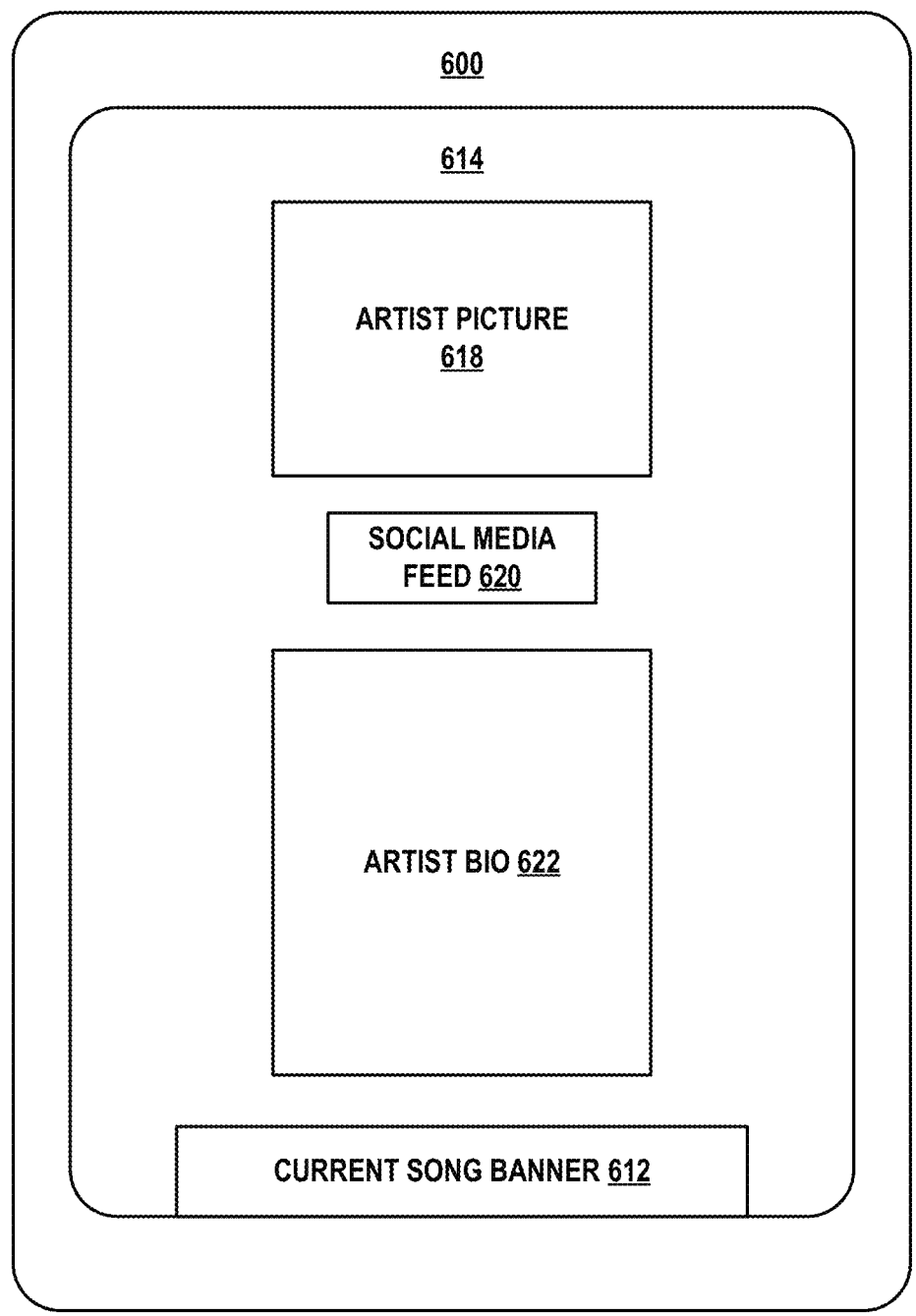
FIG. 6B illustrates another screen of the exemplary user interface shown in FIG. 6A that can implement aspects of the described subject matter.
Figure 6C:
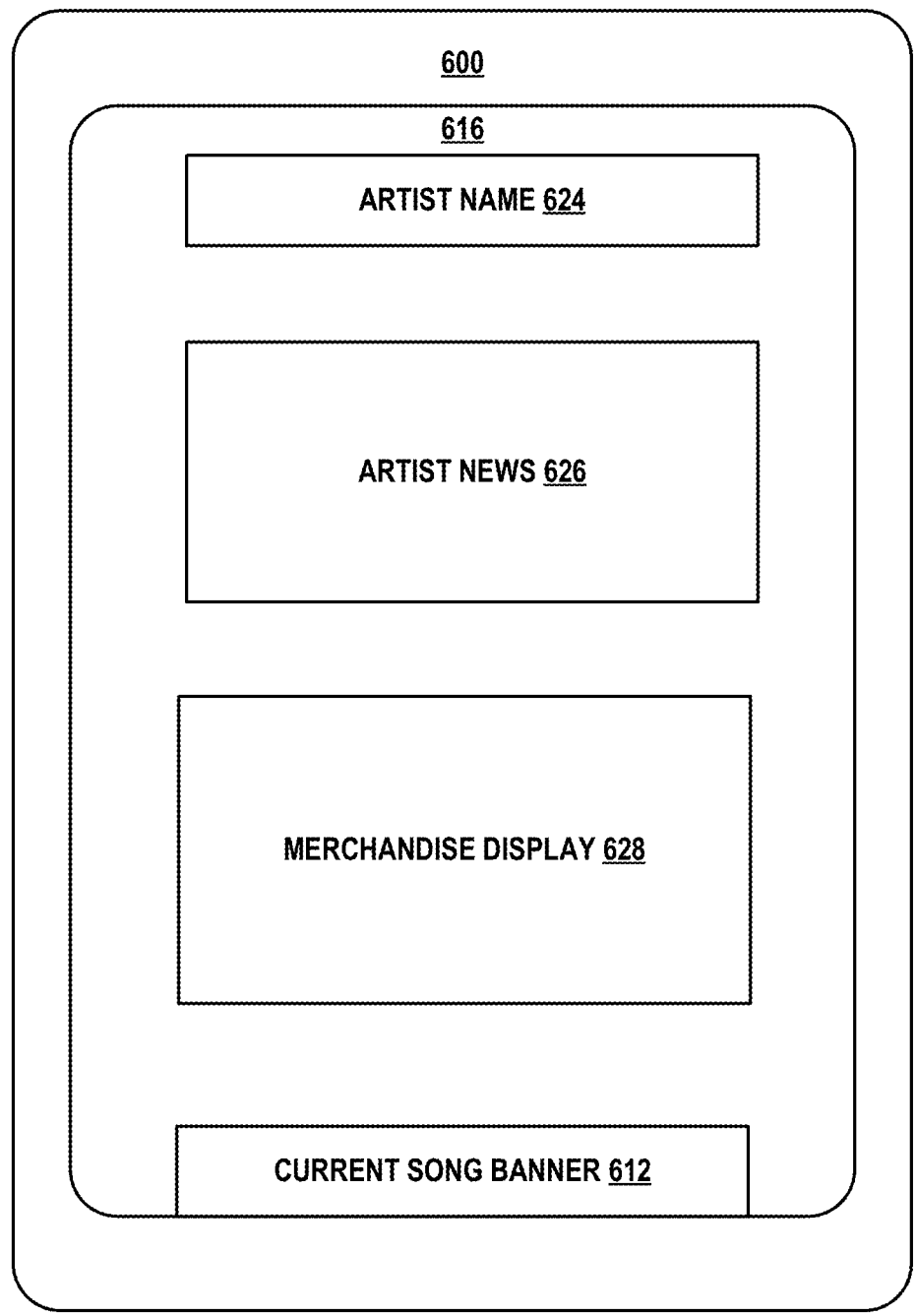
FIG. 6C illustrates another screen of the exemplary user interface shown in FIG. 6A that can implement aspects of the described subject matter.

FIGS. 6A-6C illustrate user interface 600 that illustrates the device screen displays that will be illustrated during an event. It is to be appreciated that aspects of the described subject matter can be implemented by various types of user interfaces that can be presented by the mobile device systems 160-168 shown in FIG. 1.

As shown in FIG. 6A, interface 600 displays an album screen 602 that displays an album cover icon 604 and a list of songs 606-610. The album screen 602 also displays the current song in a current song banner 612 at the bottom of the page. The album cover icon 604 can be an actual album cover for a particular artists or can be a "virtual" album cover that correspond to a group of songs that are collected in an ad hoc manner for an event or for some other reason.

Referring to FIGS. 6B-6C with continuing reference to the foregoing figures, interface 600 displays a pair of artist profile pages 614-616. The profile page 614 includes an artist picture 618, a social media feed 620 and bio 622. The profile page 616 includes a display of the artist's name 624, the latest artist news 626, and a link to a merchandise display 628 that can display either merchandise for purchase and, optionally, for pickup at the venue or shipment to the customer's address. The artist profile pages 614-616 also displays the current song in a current song banner 612 at the bottom of each page.

Exemplary Processes

Figure 7:
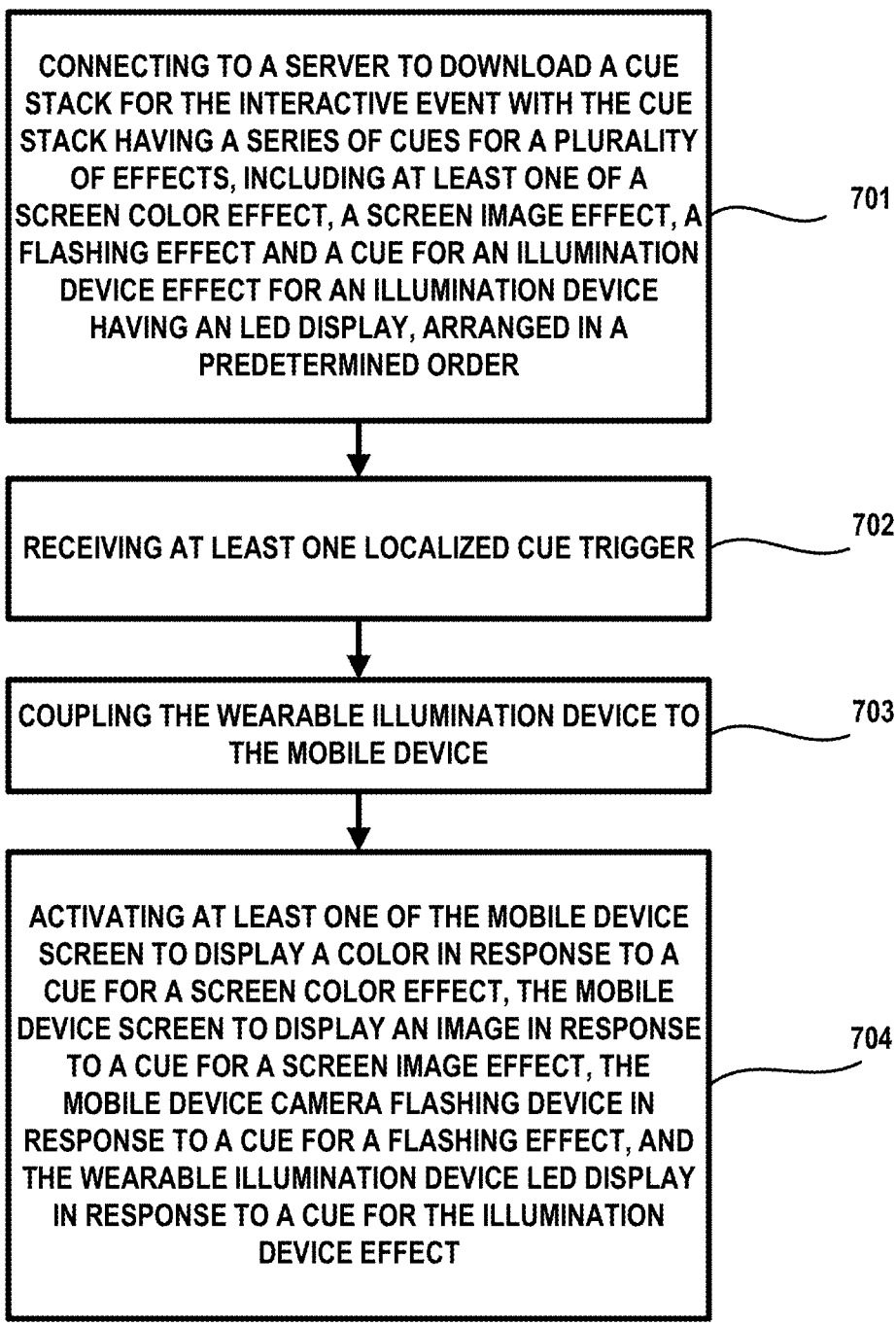
FIG. 7 illustrates an exemplary process in accordance with an embodiment of the invention.

Referring to FIG. 7 with continuing reference to the foregoing figures, a computer-implemented method 700 is illustrated as an embodiment of an exemplary audience interaction system in accordance with aspects of the described subject matter. Computer-implemented method 700, or portions thereof, can be performed by one or more computing devices, a computer system, computer-executable instructions, software, hardware, firmware or a combination thereof in various embodiments. For example, computer-implemented method 700 can be performed by mobile device systems 160-168 shown in FIG. 1, mobile device system 200 shown in FIG. 2A, or other suitable computer system.

At 701, an audience interaction system can configure and implement a mobile device system to connect to a server to download a cue stack for the interactive event with the cue stack having a series of cues for a plurality of effects, including at least one of a screen color effect, a screen image effect, a flashing effect and a cue for an illumination device effect for an illumination device having an LED display, arranged in a predetermined order. In this exemplary process, mobile device systems 160-168 shown in FIG. 1 or mobile device system 200 shown in FIG. 2A can connect to the server 120 to download a cue stack for an interactive event, such as the event corresponding to data model 400 shown in FIG. 4. The illumination device can be the wearable accessory 220 shown in FIG. 2A.

At 702, the audience interaction system can implement and utilize the mobile device system to receive at least one localized cue trigger. In this exemplary process, the mobile device system can be mobile device systems 160-168 shown in FIG. 1 or mobile device system 200 shown in FIG. 2A. The mobile device system can receive the cue trigger from cue trigger generator 156 shown in FIG. 1.

At 703, the audience interaction system can couple the wearable illumination device to the mobile device. In this exemplary embodiment, the illumination device can be the wearable accessory 220 shown in FIG. 2A. The mobile device system can be mobile device systems 160-168 shown in FIG. 1 or mobile device system 200 shown in FIG. 2A.

At 704, the audience interaction system can implement and utilize the mobile device system to activate at least one of the mobile device screen to display a color in response to a cue for a screen color effect, the mobile device screen to display an image in response to a cue for a screen image effect, the mobile device camera flashing device in response to a cue for a flashing effect, and the wearable illumination device LED display in response to a cue for the illumination device effect. In this exemplary embodiment, the mobile device system can be mobile device systems 160-168 shown in FIG. 1 or mobile device system 200 shown in FIG. 2A.

The mobile device screen, camera, and camera flashing device can be screen 238, camera 240, and flashing device 242 shown in FIG. 2A. The wearable illumination device LED display can be generated by LED 250 shown in FIG. 2A.

Supported Aspects

The detailed description provided above in connection with the appended drawings explicitly describes and supports various aspects of audience interaction in accordance with the described subject matter. By way of illustration and not limitation, supported aspects of the audience interaction system include a mobile computing system for participating in an interactive event comprising: a screen; a camera having a flashing device; a processor configured to execute computer-executable instructions; and memory storing computer-executable instructions configured to implement: a retrieving component for connecting to a server to download a cue stack for the interactive event with the cue stack having a series of cues for a plurality of effects, including at least one of a screen color effect, a screen image effect, and a flashing effect, arranged in a predetermined order, a receiving component for receiving at least one cue trigger from a localized trigger generator, a rendering component for matching the cue trigger to a cue within the cue stack, wherein the rendering component can activate the screen to display a color in response to a cue for a screen color effect, can activate the screen to display an image in response to a cue for a screen image effect, and can activate the flashing device in response to a cue for a flashing effect.

Supported aspects include the foregoing system, further comprising: a smartphone; wherein the screen, the camera, the processor, and the smartphone.

Supported aspects include any of the foregoing systems, further comprising: a wearable illumination device having an LED display coupled to the smartphone; wherein the cue stack can include a cue for an illumination device effect and the rendering component can activate the wearable illumination device LED display in response to a cue for the illumination device effect.

Supported aspects include any of the foregoing systems, wherein the wearable illumination device is a device selected from the group consisting of a wristband and a bracelet.

Supported aspects include a mobile device that can illuminate neighboring wristbands or bracelets.

Supported aspects include any of the foregoing systems, wherein the retrieving component has the ability to connect to the server to synchronize the smartphone with other smartphones at the interactive event.

Supported aspects include any of the foregoing systems, wherein the retrieving component has the ability to download a centralized time from the server to synchronize the cue stack with other smartphones at the interactive event.

Supported aspects include any of the foregoing systems, wherein the retrieving component is configured to download the cue stack before the beginning of the interactive event.

Supported aspects include any of the foregoing systems, wherein each effect has predetermined parameters.

Supported aspects include any of the foregoing systems, wherein the localized trigger generator connects to the mobile computing system electronically using at least one of a Wi-Fi network, a cellular network, a mesh network, an ultrasonic trigger, and a short-wavelength UHF radio broadcast device that broadcasts radio waves in the ISM band from 2.4 to 2.485 GHz.

Supported aspects include a method, an apparatus, and/or means for implementing and/or performing any of the foregoing systems or portions thereof.

Supported aspects include a computer-implemented method for participating in an interactive event with a mobile device having a screen and a camera with a flashing device, the computer-implemented method comprising: connecting to a server to download a cue stack for the interactive event with the cue stack having a series of cues for a plurality of effects, including at least one of a screen color effect, a screen image effect, a flashing effect and a cue for an illumination device effect for an illumination device having a manipulatable light source, receiving at least one localized cue trigger, coupling the wearable illumination device to the mobile device, and activating at least one of the mobile device screen to display a color in response to a cue for a screen color effect, the mobile device screen to display an image in response to a cue for a screen image effect, the mobile device camera flashing device in response to a cue for a flashing effect, and the wearable illumination device manipulatable light source in response to a cue for the illumination device effect.

Supported aspects include the foregoing computer-implemented method, wherein the mobile device is smartphone.

Supported aspects include any of the foregoing computer-implemented methods, further comprising: synchronizing the cue stack on the smartphone with the cue stack on other smartphones at the event.

Supported aspects include any of the foregoing computer-implemented methods, wherein the wearable illumination device is a device selected from the group consisting of a wristband and a bracelet.

Supported aspects include any of the foregoing computer-implemented methods, wherein the manipulatable light source is a manipulatable light source selected from the group consisting of an LED, an organic LED, an electroluminescent wire, and electroluminescent paint.

Supported aspects include a system, an apparatus, and/or means for implementing and/or performing any of the foregoing methods or portions thereof.

Supported aspects include a system for providing an interactive event comprising: a plurality of smartphones; each smartphone having a screen and a flashing device; a server for sending a cue stack to the plurality of smartphones; the cue stack having a series of cues for a plurality of effects, including at least one of a screen color effect, a screen image effect, and a flashing effect, arranged in a predetermined order; and a cue trigger generator for sending cue triggers that correspond to the cues in the cue stack to the plurality of smartphones; wherein each smartphone can activate each smartphone screen to display a color in response to a cue for a screen color effect, each smartphone can activate each smartphone screen to display an image in response to a cue for a screen image effect, and each smartphone can activate the flashing device in response to a cue for a flashing effect.

Supported aspects include the foregoing system, further comprising: a plurality of wearable illumination devices with LED displays; and each wearable illumination device being coupled to one of the smartphones; wherein the cue stack can include a cue for an illumination device effect and each smartphone can activate the wearable illumination device LED display in the coupled wearable illumination device in response to a cue for the illumination device effect.

Supported aspects include the foregoing system, wherein the cue trigger generator includes a light board and a musical instrument digital interface.

Supported aspects include any of the foregoing systems, further comprising: a cue stack creation component for uploading a cue stack to the server.

Supported aspects include any of the foregoing systems, wherein the cue stack creation component hosts an interactive website.

Supported aspects include any of the foregoing systems, wherein the plurality of smartphones are synchronized with the server.

Supported aspects include a method, an apparatus, and/or means for implementing and/or performing any of the foregoing systems or portions thereof.

Supported aspects include mobile computing system for participating in an interactive event comprising: a wearable accessory having a movement sensor for detecting movement by the wearable accessory and for generating an impulse in response to the movement, and a smartphone coupled to the wearable accessory movement sensor, wherein the smartphone includes a processor configured to execute computer-executable instructions and memory storing computer-executable instructions configured to: receive the impulse from the movement sensor, connect to an external network upon receipt of the impulse, and generate output for transmission over the external network.

Supported aspects include the foregoing mobile computing system, wherein the wearable accessory is a bracelet.

Supported aspects include any of the foregoing mobile computing systems, wherein the external network is the Internet.

Supported aspects include any of the foregoing mobile computing systems, wherein the shock is a shock selected from the group consisting of a clap, a first pump, high-five, a jump, a dance move, and a hand wave.

Supported aspects include any of the foregoing mobile computing systems, wherein the smartphone includes electronic indicia corresponding to the smartphone owner and the smartphone generates output to add the smartphone owner to a mailing list upon receipt of the impulse from the movement sensor.

Supported aspects include any of the foregoing mobile computing systems, wherein the smartphone connects to a server that hosts a social media application on the external network and the output includes instructions to post a status update on the social media application.

Supported aspects include any of the foregoing mobile computing systems, wherein the smartphone is coupled to a server that hosts a social media application on the external network and the output includes instructions to post a status update on the social media application.

Supported aspects include any of the foregoing mobile computing systems, wherein the smartphone connects to a server that hosts a social media application on the external network and the output includes instructions to post a like on the social media application.

Supported aspects include any of the foregoing mobile computing systems, wherein the smartphone connects to a server that hosts a social media application on the external network and the output includes instructions to share content selected from the group consisting of a photo, a video, and a hyperlink on the social media application.

Supported aspects include any of the foregoing mobile computing systems, wherein the smartphone includes a camera and smartphone can utilize the camera to take the photo upon receipt of the impulse from the movement sensor.

Supported aspects include any of the foregoing mobile computing systems, wherein the smartphone connects to a server that hosts an application at least one of an electronic coupon and an electronic prize voucher on the external network and the output includes instructions to request the at least one of an electronic coupon and an electronic prize voucher upon receipt of the impulse from the movement sensor.

Supported aspects include any of the foregoing mobile computing systems, further comprising a shock sensor for posting social media content to a display device upon receipt of a trigger.

Supported aspects include a method, an apparatus, and/or means for implementing and/or performing any of the foregoing systems or portions thereof.

Supported aspects include a computer-implemented method for participating in an interactive event, the computer-implemented method comprising: coupling a mobile device to a wearable accessory having a movement sensor, sending an impulse to the mobile device in response to a shock to the movement sensor, connecting the mobile device to an external network upon receipt of the impulse, generating output for transmission over the external network with the mobile device, and sending the output over the external network.

Supported aspects include the foregoing computer-implemented method, wherein the mobile device is smartphone.

Supported aspects include any of the foregoing computer-implemented methods, wherein the external network is the Internet.

Supported aspects include any of the foregoing computer-implemented methods, wherein the wearable accessory is a bracelet.

Supported aspects include any of the foregoing computer-implemented methods, further comprising: enabling the subscription to an electronic mailing list over the Internet in response to a shock to the movement sensor.

Supported aspects include any of the foregoing computer-implemented methods, further comprising: connecting to a server that hosts a social media application on the Internet; and enabling the posting of a status update on the social media application.

Supported aspects include any of the foregoing computer-implemented methods, further comprising: connecting to a server that hosts a social media application on the Internet; and enabling the posting of a like on the social media application.

Supported aspects include any of the foregoing computer-implemented methods, further comprising: connecting to a server that hosts a social media application on the Internet; and enabling the sharing content selected from the group consisting of a photo, a video, and a hyperlink on the social media application.

Supported aspects include any of the foregoing computer-implemented methods, further comprising: enabling a camera on the smartphone to take the photo upon receipt of the impulse from the movement sensor.

Supported aspects include a system, an apparatus, and/or means for implementing and/or performing any of the foregoing methods or portions thereof.

Supported aspects include a mobile computing system for participating in an interactive event comprising: a bracelet having a movement sensor for detecting a shock to the wearable accessory and for generating an impulse in response to the shock, and a smartphone coupled to the bracelet movement sensor, wherein the smartphone includes means for receiving the impulse from the movement sensor, means for connecting to an external network upon receipt of the impulse, and means for generating output for transmission over the external network.

Supported aspects include a method, an apparatus, and/or means for implementing and/or performing the foregoing system or portions thereof.

Supported aspects include an interactive event system comprising: a cue stack generator for generating a cue stack having a series of cues for a plurality of effects, including at least one of a screen color effect, a screen image effect, and a flashing effect, arranged in a predetermined order, a cue stack transmitter for sending the cue stack to a mobile device having a screen and a camera having a flashing device, and a cue trigger generator for sending localized cue triggers to activate the screen to display a color in response to a cue for a screen color effect, to activate the screen to display an image in response to a cue for a screen image effect, and to activate the flashing device in response to a cue for a flashing effect.

Supported aspects include the foregoing interactive event system, wherein the mobile device is a smartphone.

Supported aspects include any of the foregoing interactive event systems, further comprising: synchronizing the smartphone with other smartphones at the interactive event.

Supported aspects include any of the foregoing interactive event systems, further comprising: generating a cue for an illumination device effect to activate a wearable illumination device LED display.

Supported aspects include any of the foregoing interactive event systems, wherein the server includes centralized time for synchronizing the smartphones at the interactive event.

Supported aspects include any of the foregoing interactive event systems, wherein the cue stack transmitter sends the cue stack to the smartphone before the beginning of the interactive event.

Supported aspects include any of the foregoing interactive event systems, wherein each effect has predetermined parameters.

Supported aspects include any of the foregoing interactive event systems, wherein the cue trigger generator utilizes at least one of a Wi-Fi network, a cellular network, a mesh network, an ultrasonic trigger, and a short-wavelength UHF radio broadcast device that broadcasts radio waves in the ISM band from 2.4 to 2.485 GHz to send the localized cue triggers.

Supported aspects include a method, an apparatus, and/or means for implementing and/or performing any of the foregoing systems or portions thereof.

Supported aspects include a computer-implemented method for creating in an interactive event, the computer-implemented method comprising: generating a cue stack having a series of cues for a plurality of effects, including at least one of a screen color effect, a screen image effect, and a flashing effect, arranged in a predetermined order, sending the cue stack to a mobile device having a screen and a camera having a flashing device, and sending localized cue triggers to activate the screen to display a color in response to a cue for a screen color effect, to activate the screen to display an image in response to a cue for a screen image effect, and to activate the flashing device in response to a cue for a flashing effect.

Supported aspects include the foregoing computer-implemented method, wherein the mobile device is a smartphone.

Supported aspects include any of the computer-implemented methods, further comprising: coupling the mobile device to a wearable accessory having an illumination device LED display.

Supported aspects include any of the computer-implemented methods, further comprising: generating a cue for an illumination device effect to activate the wearable illumination device LED display.

Supported aspects include any of the computer-implemented methods, further comprising: synchronizing the smartphone with other smartphones at the interactive event.

Supported aspects include any of the computer-implemented methods, further comprising: synchronizing the smartphones at the interactive event to centralized time.

Supported aspects include any of the computer-implemented methods, further comprising: sending the cue stack to the smartphone before the beginning of the interactive event.

Supported aspects include any of the computer-implemented methods, further comprising: sending the localized cue triggers to the smartphone electronically using at least one of a Wi-Fi network, a cellular network, a mesh network, an ultrasonic trigger, and a short-wavelength UHF radio broadcast device that broadcasts radio waves in the ISM band from 2.4 to 2.485 GHz.

Supported aspects include any of the computer-implemented methods, wherein each effect has predetermined parameters.

Supported aspects include a system, an apparatus, and/or means for implementing and/or performing any of the foregoing methods or portions thereof.

Supported aspects include an interactive system comprising: means for generating a cue stack having a series of cues for a plurality of effects, means for transmitting the cue stack to a mobile device having a screen and a camera having a flashing device, and means for transmitting localized cue triggers to activate the screen, the camera, and the flashing device on the mobile device.

Supported aspects include the foregoing interactive system, further comprising: means generating a cue for an illumination device effect to activate a wearable illumination device LED display.

Supported aspects include any of the foregoing interactive systems, further comprising: means for synchronizing the mobile device with other mobile devices at an interactive event.

Supported aspects include a method, an apparatus, and/or means for implementing and/or performing any of the foregoing systems or portions thereof.

Supported aspects include an interactive event system comprising: an event cue stack creator, an event cue stack transmitter, an event cue trigger generator, and a plurality of mobile device systems, wherein the event cue stack creator generates a cue stack having a series of cues for a plurality of effects, including at least one of a screen color effect, a screen image effect, and a flashing effect, arranged in a predetermined order, wherein the event cue stack transmitter receives the cue stack from the event cue stack creator and transmits the cue stack to the plurality of mobile device systems, and wherein the cue trigger generator sends localized cue triggers to the mobile device systems.

Supported aspects include the foregoing interactive event system, wherein the plurality of mobile device systems include smartphones.

Supported aspects include any of the foregoing interactive event systems, wherein at least one of the smartphones is coupled to a wearable illumination device having an LED display.

Supported aspects include any of the foregoing interactive event systems, wherein the wearable illumination device is a device selected from the group consisting of a wristband and a bracelet.

Supported aspects include any of the foregoing interactive event systems, further comprising: a server for synchronizing the mobile device systems to a centralized time.

Supported aspects include any of the foregoing interactive event systems, wherein each effect has predetermined parameters.

Supported aspects include any of the foregoing interactive event systems, wherein the cue trigger generator connects to the mobile computing systems electronically using at least one of a Wi-Fi network, a cellular network, a mesh network, an ultrasonic trigger, and a short-wavelength UHF radio broadcast device that broadcasts radio waves in the ISM band from 2.4 to 2.485 GHz.

Supported aspects include any of the foregoing interactive event systems, wherein the event cue stack transmitter is hosted on a first server, the event cue stack generator is hosted on a second server, and the first server is connected to the second server over a network.

Supported aspects include any of the foregoing interactive event systems, wherein the first server hosts an API for converting a data model into a cue stack.

Supported aspects include any of the foregoing interactive event systems, wherein the event cue stack creator is connected to the first server over the network.

Supported aspects include any of the foregoing interactive event systems, wherein the event cue stack transmitter and the event cue stack generator is hosted on the same server.

Supported aspects include any of the foregoing interactive event systems, wherein the event cue stack transmitter is hosted on a first server, the event cue stack generator is hosted on a second server, and the first server is connected to the second server over a network.

Supported aspects include any of the foregoing interactive event systems, wherein the cue trigger generator is prompted by at least one of a MIDI implementing device, a personal computer, and a light board to send a localized cue trigger to the mobile device systems.

Supported aspects include a method, an apparatus, and/or means for implementing and/or performing any of the foregoing apparatuses or portions thereof.

Supported aspects include a method of assembling an interactive event system comprising: connecting an event cue stack creator to an event cue stack transmitter to enable the event cue stack creator to send a cue stack having a series of cues for a plurality of effects to the cue stack transmitter, connecting the event cue stack transmitter to a plurality of smartphones to enable the event cue stack transmitter to transmit the cue stack to the plurality of smartphones, and connecting an event cue trigger generator to the plurality of smartphones to enable the cue trigger generator to send localized cue triggers to the plurality of smartphones.

Supported aspects include the foregoing method, further comprising: coupling the mobile device to a wearable accessory having an illumination device LED display to enable the wearable accessory to activate the illumination device LED display in response to a localized cue trigger from the cue trigger generator.

Supported aspects include any of the foregoing methods, further comprising: enabling a server to synchronize the plurality of smartphones to centralized time.

Supported aspects include any of the foregoing methods, further comprising: enabling the cue stack transmitter to send the cue stack to the plurality of smartphones before the beginning of an interactive event.

Supported aspects include any of the foregoing methods, further comprising: enabling the cue trigger generator to send the localized cue triggers to the plurality of smartphones electronically using at least one of a Wi-Fi network, a cellular network, a mesh network, an ultrasonic trigger, and a short-wavelength UHF radio broadcast device that broadcasts radio waves in the ISM band from 2.4 to 2.485 GHz.

Supported aspects include a system, an apparatus, and/or means for implementing and/or performing any of the foregoing methods or portions thereof.

Supported aspects include an interactive event system comprising: a plurality of smartphones, means for generating a cue stack having a series of cues for a plurality of effects, means for transmitting the cue stack to the plurality of smartphones, and means for sending localized cue triggers to the plurality of smartphones enable the plurality of effects.

Supported aspects include the foregoing interactive event system, wherein at least one of the plurality of smartphones is coupled to a wearable illumination device having an LED display.

Supported aspects include a method, a system, and/or means for implementing and/or performing any of the foregoing apparatuses or portions thereof.

Supported aspects of the audience interaction system can provide various attendant and/or technical advantages in terms of improved efficiency and/or savings. By way of illustration and not limitation, various features and implementations of the systems and methods in accordance with the described subject matter offer many benefits, which include harnessing various features of audience smartphones to incorporate them into an interactive performance. These features include the light and sound emitting properties of phones, as well as the use of the front screen and the LED flash as light source. Similarly, the phone speakers can be used to emit sound, and phone screens can receive aural and haptic input through the phone microphone and screen, respectively.

Supported aspects include an audience interaction system that utilizes an array of audience phones that can be lit or used to generate sound in unison that overcomes existing problems with connectivity and network latency in smaller venues.

Supported aspects include providing an audience interaction system that communicates with audience smartphones at a venue using a cue trigger generator that can send localized cue triggers through a Wi-Fi network, a cellular network, a mesh network, and/or a Bluetooth broadcast network. Alternatively, supported aspects include an audience interaction system that can allow audiences to participate over a wide geographical area to participate in the event remotely.

Supported aspects include providing an audience interaction system that does not utilize GPS location data, which lacks the accuracy needed for interesting audience-wide spatial effects, and, for which, accuracy is further degraded inside buildings.

Supported aspects include providing methods and systems for creating waves of sound and light across the audience coordinated to on-stage performance patterns.

Supported aspects include coupling a wristband to a smartphone within an audience, so that the wristband can be triggered to light up in real-time in a variety of configurations. The wristband can be 100% interactive.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A mobile computing system for participating in a location-based interactive event comprising:
    a bracelet having a movement sensor for detecting movement of the bracelet and for generating an impulse in response to the movement, and
    a smartphone coupled to the bracelet movement sensor,
    wherein the bracelet and the smartphone are located within the same location-based interactive event venue,
    wherein the smartphone includes electronic indicia corresponding to the smartphone owner and a processor configured to execute computer-executable instructions and memory storing computer-executable instructions configured to:
    receive the impulse from the movement sensor,
    connect to the Internet upon receipt of the impulse, and
    generate output for transmission over the Internet with the output including output to add the smartphone owner to an email mailing list upon receipt of the impulse from the movement sensor.

2. The mobile computing system as set forth in claim 1, wherein the movement is a shock selected from the group consisting of a clap, a first pump, a high-five, a jump, a dance movement, and a hand wave.

3. The mobile computing system as set forth in claim 1, wherein the smartphone is coupled to a server that hosts a social media application on the Internet and the output includes instructions to post a status update on the social media application.

4. The mobile computing system as set forth in claim 1, wherein the smartphone connects to a server that hosts a social media application over the Internet and the output includes instructions to post a like on the social media application.

5. The mobile computing system as set forth in claim 1, wherein the smartphone connects to a server that hosts a social media application over the Internet and the output includes instructions to share content selected from the group consisting of a photo, a video, and a hyperlink on the social media application.

6. The mobile computing system as set forth in claim 5, wherein the smartphone includes a camera and the smartphone can utilize the camera to take the photo upon receipt of the impulse from the movement sensor.

7. The mobile computing system as set forth in claim 1, wherein the smartphone connects to an Internet server that hosts an application that has at least one of an electronic coupon and an electronic prize voucher, and the output includes instructions to request the at least one of an electronic coupon and an electronic prize voucher upon receipt of the impulse from the movement sensor.

8. The mobile computing system as set forth in claim 1, further comprising a shock sensor for posting social media content to a display device upon receipt of a trigger.

9. A computer-implemented method for participating in a location-based interactive event, the computer-implemented method comprising:
    coupling a mobile device to a bracelet having a movement sensor within the same location-based interactive event venue,
    sending an impulse to the mobile device in response to a shock to the movement sensor,
    connecting the mobile device to the Internet upon receipt of the impulse,
    generating output for transmission over the Internet with the mobile device,
    sending the output over the Internet, and
    enabling a subscription to an electronic email mailing list over the Internet in response to the shock to the movement sensor.

10. The computer-implemented method of claim 9, wherein the mobile device is smartphone.

11. The computer-implemented method of claim 9, further comprising:
    connecting to a server that hosts a social media application on the Internet; and
    enabling the posting of a status update on the social media application.

12. The computer-implemented method of claim 9, further comprising:
    connecting to a server that hosts a social media application on the Internet; and
    enabling the posting of a like on the social media application.

13. The computer-implemented method of claim 9, further comprising:
    connecting to a server that hosts a social media application on the Internet; and
    enabling the sharing of content selected from the group consisting of a photo, a video, and a hyperlink on the social media application.

14. The computer-implemented method of claim 10, further comprising:
    enabling a camera on the smartphone to take the photo upon receipt of the impulse from the movement sensor.

15. A mobile computing system for participating in a location-based interactive event comprising:

a bracelet having a movement sensor for detecting a shock to the bracelet and for generating an impulse in response to the shock, and a smartphone coupled to the bracelet movement sensor, wherein the bracelet and the smartphone are located within the same location-based interactive event venue;

wherein the smartphone includes means for receiving the impulse from the movement sensor, means for connecting to an external network upon receipt of the impulse, and means for generating output for transmission over the external network; and wherein the output includes adding the smartphone owner to an email mailing list upon receipt of the impulse from the movement sensor.

16. The mobile computing system as set forth in claim 15, wherein the smartphone is coupled to a server that hosts a social media application on the Internet and the output includes instructions to post a status update on the social media application.

17. The mobile computing system as set forth in claim 15, wherein the smartphone connects to a server that hosts a social media application over the Internet and the output includes instructions to post a like on the social media application.

18. The mobile computing system as set forth in claim 15, wherein the smartphone connects to a server that hosts a social media application over the Internet and the output includes instructions to share content selected from the group consisting of a photo, a video, and a hyperlink on the social media application.

19. The mobile computing system as set forth in claim 15, further comprising means for posting social media content to a display device upon receipt of a trigger.

* * * * *